(12) United States Patent
Bhushan et al.

(10) Patent No.: US 11,399,286 B2
(45) Date of Patent: Jul. 26, 2022

(54) SCRAMBLING FOR WIRELESS COMMUNICATIONS

(71) Applicant: QUALCOMM Incorporated, San Diego, CA (US)

(72) Inventors: Naga Bhushan, San Diego, CA (US); Gavin Bernard Horn, La Jolla, CA (US); Soo Bum Lee, San Diego, CA (US); Ozcan Ozturk, San Diego, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 16/997,493

(22) Filed: Aug. 19, 2020

(65) Prior Publication Data

US 2021/0058792 A1     Feb. 25, 2021

Related U.S. Application Data

(60) Provisional application No. 62/889,479, filed on Aug. 20, 2019.

(51) Int. Cl.
*H04L 29/06* (2006.01)
*H04W 12/106* (2021.01)
(Continued)

(52) U.S. Cl.
CPC ......... *H04W 12/106* (2021.01); *H04L 27/345* (2013.01); *H04W 12/041* (2021.01); *H04W 12/12* (2013.01)

(58) Field of Classification Search
CPC . H04W 12/106; H04W 12/041; H04W 12/12; H04L 27/345; H04L 25/03866;
(Continued)

(56) References Cited

U.S. PATENT DOCUMENTS 4,278,837 A    7/1981  Best
6,683,955 B1 * 1/2004  Horne ................... H04L 9/0631
                                                        380/34
(Continued)

FOREIGN PATENT DOCUMENTS

CN         101057422 A  * 10/2007  ........... H04L 27/262
CN         106878277 A  *  6/2017  ......... H04L 63/0428
(Continued)

OTHER PUBLICATIONS

Liu et al., "Physical Layer Security in OFDM-PON Based on Dimension-Transformed Chaotic Permutation", IEEE Photonics Technology Letters, vol. 26 No. 2, Jan. 15, 2014, pp. 127-130 (Year: 2014).*

(Continued)

*Primary Examiner* — John B King
(74) *Attorney, Agent, or Firm* — Holland & Hart LLP/Qualcomm

(57) ABSTRACT

Aspects of the present disclosure describe scrambling of information for wireless communications to prevent deciphering or altering by unintended recipients. An example method may include generating, by a first device, a scrambling key based on at least one of a freshness parameter or a private key. The private key is known by the first device and a second device. The method also includes scrambling a payload based on the scrambling key at a physical layer. A packet includes the payload for wireless transmission from the first device to the second device via a shared channel.

56 Claims, 16 Drawing Sheets

(51) Int. Cl.
*H04W 12/12* (2021.01)
*H04L 27/34* (2006.01)
*H04W 12/041* (2021.01)

(58) Field of Classification Search
CPC ....... H04L 27/34; H04L 63/0428; H04K 1/06; H04K 1/04; H04K 1/00; H04K 1/006; H04K 1/02
See application file for complete search history.

(56) References Cited

U.S. PATENT DOCUMENTS

| | | | | |
|---|---|---|---|---|
| 2005/0031051 | A1* | 2/2005 | Rosen | H04B 1/713 375/147 |
| 2006/0149678 | A1* | 7/2006 | Malvar | H04K 1/02 705/50 |
| 2008/0267314 | A1* | 10/2008 | Bar-Sade | H04L 63/0428 375/272 |
| 2009/0264142 | A1* | 10/2009 | Sankar | H04L 25/0204 455/501 |
| 2011/0266348 | A1* | 11/2011 | Denniston, Jr. | G06K 7/10722 235/454 |
| 2015/0052360 | A1* | 2/2015 | Ravishankar | H04L 63/0428 713/171 |
| 2018/0212646 | A1* | 7/2018 | Hannebauer | H04J 13/10 |
| 2019/0159030 | A1* | 5/2019 | Lim | H04L 9/3226 |
| 2019/0306698 | A1* | 10/2019 | Goto | H04W 12/50 |
| 2020/0204309 | A1* | 6/2020 | Namboodiri | H04L 27/2608 |

FOREIGN PATENT DOCUMENTS

| | | | | |
|---|---|---|---|---|
| JP | 5615273 B2 | * | 10/2014 | ............ H04L 9/065 |
| WO | WO-2009009929 A1 | * | 1/2009 | ............ H04L 9/065 |

OTHER PUBLICATIONS

Huo F., et al., "XOR Encryption Versus Phase Encryption, an In-Depth Analysis", IEEE Transactions On Electromagnetic Compatibility, IEEE Service Center, Newyork, NY, US, vol. 57, No. 4, Aug. 1, 2015 (Aug. 1, 2015), pp. 1-9, XP011666267, ISSN: 0018-9375, DOI:10.1109/TEMC.2015.2390229 [retrieved on Aug. 13, 2015] the Whole Document.

International Search Report and Written Opinion—PCT/US2020/047109—ISA/EPO—dated Nov. 9, 2020 (194626WO).

Li H., et al., "Secure Transmission in OFDM Systems by Using Time Domain Scrambling", 2006 IEEE 63rd Vehicular Technology Conference, IEEE, Jun. 2, 2013 (Jun. 2, 2013), 5 pages, XP032547625, ISSN: 1550-2252, DOI:10.1109/VTCSPRING.2013.6692745 [retrieved on Dec. 22, 2013] the whole document.

Zhang J., et al., "Securing Wireless Communications of the Internet of Things from the Physical Layer, An Overview", Entropy, vol. 19, No. 8, Aug. 18, 2017 (Aug. 18, 2017), p. 420, XP055661156, 16 pages, http://www.mdpi.com/journal/entropy, CH ISSN: 1099-4300, DOI: 10.3390/e19080420, Sections 1, 2, 4.

* cited by examiner

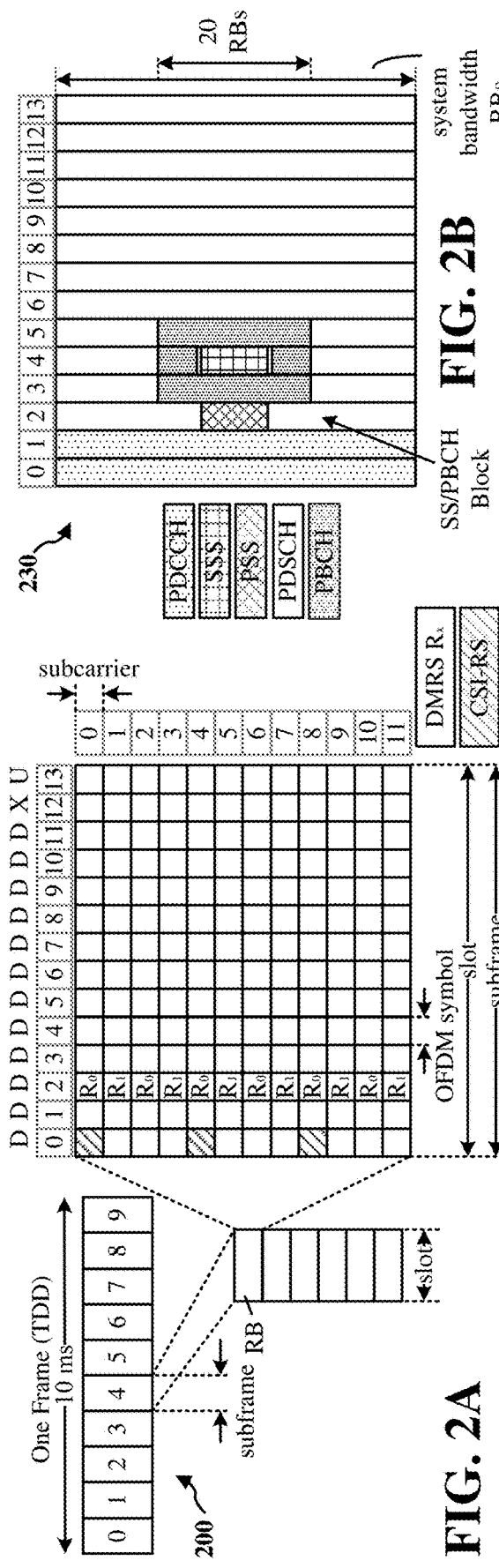
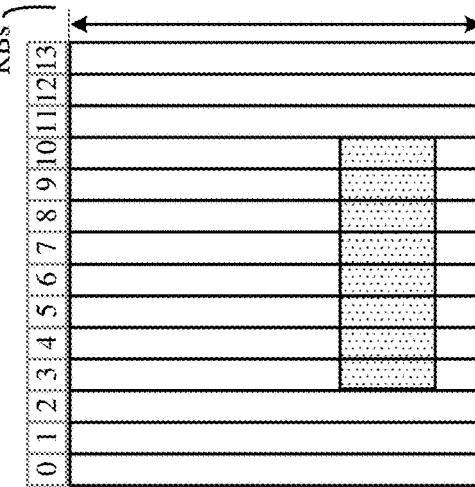
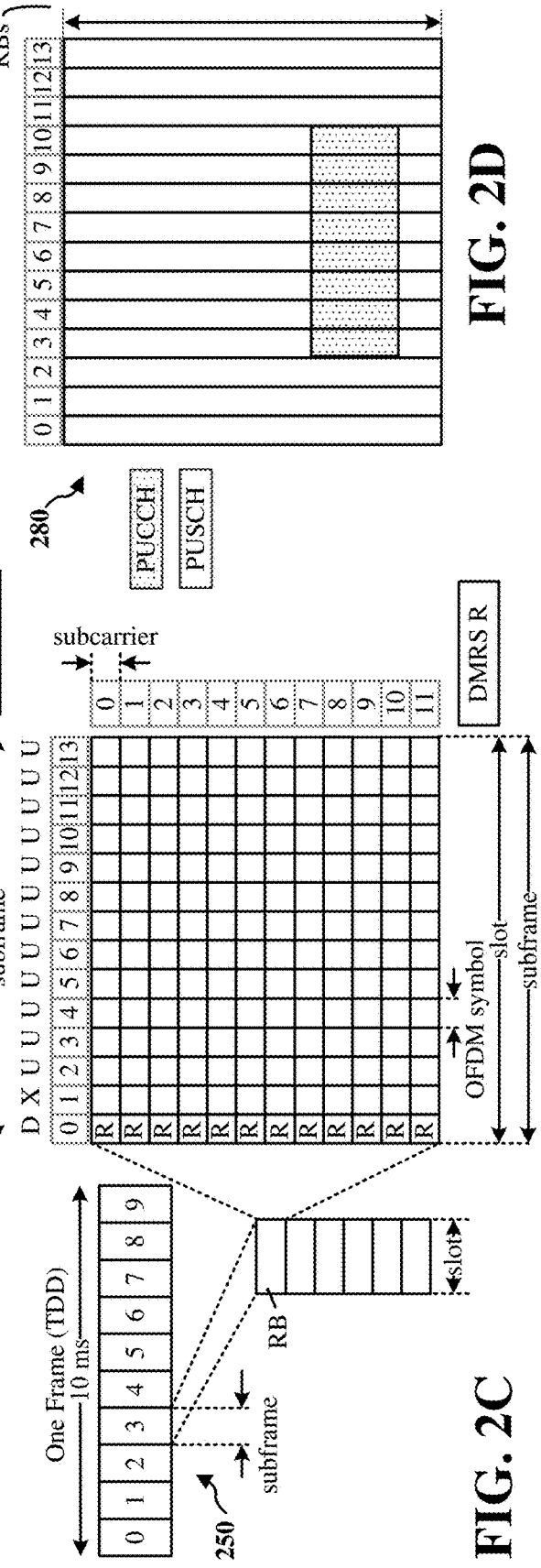
FIG. 2A  FIG. 2B  FIG. 2C  FIG. 2D

SCRAMBLING FOR WIRELESS COMMUNICATIONS

CROSS-REFERENCE TO RELATED APPLICATIONS

This patent application claims priority to U.S. Provisional Patent Application No. 62/889,479 entitled "SCRAMBLING FOR WIRELESS COMMUNICATIONS" and filed on Aug. 20, 2019, which is assigned to the assignee hereof and incorporated by reference in this patent application.

TECHNICAL FIELD

The present disclosure relates generally to communication systems, and more specifically to a physical layer approach to scrambling information for wireless transmission.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources. Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure describe scrambling of information for wireless communications to prevent deciphering and/or altering of the information by unintended recipients. An example method may include generating, by a first device (such as a user equipment or a base station), a scrambling sequence based on a freshness parameter. The method may also include scrambling a payload with the scrambling sequence. The payload is for a packet for wireless transmission from the first device to a second device via a shared physical channel (such as defined in the LTE standard or 5G NR standard). In some implementations, the scrambling sequence may be further based on a private shared key between the first device and the second device. Scrambling based on a private shared key and freshness parameter may prevent a snooping device from deciphering packet information or performing overshadowing or spoofing attacks. Scrambling may also include permutations to further prevent deciphering or attacks.

In some aspects of the disclosure, an example method, an example computer-readable medium, and an example apparatus may be provided. An example method may include generating, by a first device, a scrambling key based on at least one of a freshness parameter or a private key. The private key is known by the first device and a second device. The method also includes scrambling a payload based on the scrambling key at a physical layer. A packet includes the payload for wireless transmission from the first device to the second device via a shared channel.

The method may include encoding the payload before scrambling. Scrambling after encoding may be an isometric transformation. The method may further include scrambling the payload with the scrambling key before encoding. In some implementations, the method includes modulating the encoded payload after scrambling the encoded payload. Scrambling the encoded payload includes XOR'ing the encoded payload and the scrambling key, and modulating the encoded payload is based on Quadrature Phase-Shift Keying (QPSK) or Quadrature Amplitude Modulation (QAM). In some implementations, the method includes encoding the payload before scrambling, modulating the scrambling key based on Quadrature Phase-Shift Keying (QPSK), and modulating the encoded payload before scrambling the encoded payload. Modulating the encoded payload is based on Quadrature Phase-Shift Keying (QPSK) or Quadrature Amplitude Modulation (QAM), and scrambling the modulated payload includes complex multiplication of the modulated payload and the modulated scrambling key.

In some implementations, the method includes encoding the payload before scrambling, scrambling the encoded payload with the scrambling key, modulating the encoded payload after scrambling the encoded payload, wherein modulating the encoded payload is based on Quadrature Phase-Shift Keying (QPSK) or Quadrature Amplitude Modulation (QAM), modulating the scrambling key based on QPSK, and scrambling the modulated payload with the modulated scrambling key. Scrambling the encoded payload may be a first isometric transformation, and scrambling the modulated payload may be a second isometric transformation. Scrambling the encoded payload may include XOR'ing the encoded payload and the scrambling key, and scrambling the modulated payload may include multiplication of complex numbers of the modulated payload and the modulated scrambling key.

In some implementations, the method includes encoding the payload before scrambling, aggregating the scrambling key, and modulating the encoded payload, before scrambling the payload, based on Quadrature Phase-Shift Keying (QPSK) or Quadrature Amplitude Modulation (QAM). Scrambling the payload may include an isometric transformation of rotation and reflection of the QAM constellations of the modulated payload based on the aggregated scrambling key. In some implementations, the method includes aggregating the payload into a K-bit sequence using a K-bit aggregator (with K being a natural number greater than or equal to two), aggregating the scrambling key into an M-bit permutation index using an M-bit aggregator (with M being a natural number greater than K), permutating the K-bit sequence with the M-bit permutation index, encoding the permutated sequence, and modulating the encoded sequence based on Quadrature Phase-Shift Keying (QPSK) or Quadrature Amplitude Modulation (QAM). The method may also include generating a cyclic redundancy check (CRC) for media access control (MAC) layer information to be transmitted to the second device. The payload may include the MAC layer information and the CRC, and scrambling the payload may include scrambling only the CRC of the payload.

In some implementations, the first device performing the above described methods is or included in a base station.

An example device may include a key generator to generate a scrambling key based on at least one of a freshness parameter or a private key. The private key is known by the device and a second device. The device also includes a first scrambler to scramble a payload based on the scrambling key. A packet includes the payload for wireless transmission from the first device to the second device via a shared channel.

The device may also include an encoder to encode the payload before scrambling. Scrambling after encoding may be an isometric transformation. In some implementations, the device includes a second scrambler to scramble the payload with the scrambling key before encoding. The device may also include a modulator to modulate the encoded payload after scrambling the encoded payload. Scrambling the encoded payload includes XOR'ing the encoded payload and the scrambling key, and modulating the encoded payload is based on Quadrature Phase-Shift Keying (QPSK) or Quadrature Amplitude Modulation (QAM).

The device may include an encoder to encode the payload before scrambling, a first modulator to modulate the scrambling key based on Quadrature Phase-Shift Keying (QPSK), and a second modulator to modulate the encoded payload before scrambling the encoded payload. Modulating the encoded payload is based on QPSK or Quadrature Amplitude Modulation (QAM), and scrambling the modulated payload includes complex multiplication of the modulated payload and the modulated scrambling key. In some implementations, the device includes an encoder to encode the payload before scrambling, a second scrambler to scramble the encoded payload with the scrambling key, a first modulator to modulate the encoded payload after scrambling the encoded payload, a second modulator to module the scrambling key based on QPSK, and a third scrambler to scramble the modulated payload with the modulated scrambling key. Scrambling the encoded payload is a first isometric transformation, and scrambling the modulated payload is a second isometric transformation. Modulating the encoded payload is based on QPSK or QAM. Scrambling the encoded payload may include XOR'ing the encoded payload and the scrambling key, and scrambling the modulated payload may include multiplication of complex numbers of the modulated payload and the modulated scrambling key.

In some implementations, the device includes an encoder to encode the payload before scrambling, an aggregator to aggregate the scrambling key, and a modulator to modulate the encoded payload, before scrambling the payload, based on QPSK or QAM. Scrambling the payload includes an isometric transformation of rotation and reflection of the QAM constellations of the modulated payload based on the aggregated scrambling key. In some implementations, the device includes a K-bit aggregator to aggregate the payload into a K-bit sequence (with K being a natural number greater than or equal to two), an M-bit aggregator to aggregate the scrambling key into an M-bit permutation index (with M being a natural number greater than K), a permutator to permutate the K-bit sequence with the M-bit permutation index, an encoder to encode the permutated sequence, and a modulator to modulate the encoded sequence based on QPSK or QAM. The device may include a cyclic redundancy check (CRC) generator to generate a CRC for media access control (MAC) layer information to be transmitted to the second device. The payload may include the MAC layer information and the CRC, and scrambling the payload may include scrambling only the CRC of the payload.

The device may include one or more components to provide media access control (MAC) layer information to be included in the payload. The device may also include one or more transmitters to transmit the packet including the payload to the second device via the shared channel. In some implementations, the device is or included in a base station.

A non-transitory, computer-readable medium storing instructions that, when executed by at least one processor of a device, cause the device to generate a scrambling key based on at least one of a freshness parameter or a private key (with the private key known by the device and a second device) and scramble a payload based on the scrambling key at a physical layer. A packet includes the payload for wireless transmission from the device to the second device via a shared channel.

Execution of the instructions may also cause the device to encode the payload before scrambling. Scrambling after encoding is an isometric transformation. Execution of the instructions may also cause the device to scramble the payload with the scrambling key before encoding and modulate the encoded payload after scrambling the encoded payload. In some implementations, scrambling the encoded payload includes XOR'ing the encoded payload and the scrambling key, and modulating the encoded payload is based on Quadrature Phase-Shift Keying (QPSK) or Quadrature Amplitude Modulation (QAM).

In some implementations, execution of the instructions causes the device to encode the payload before scrambling, modulate the scrambling key based on QPSK, and modulate the encoded payload before scrambling the encoded payload. Modulating the encoded payload is based on QPSK or QAM, and scrambling the modulated payload includes complex multiplication of the modulated payload and the modulated scrambling key. In some implementations, execution of the instructions causes the device to encode the payload before scrambling, scramble the encoded payload with the scrambling key, modulate the encoded payload after scrambling the encoded payload, modulate the scrambling key based on QPSK, and scramble the modulated payload with the modulated scrambling key. Scrambling the encoded payload is a first isometric transformation, and scrambling the modulated payload is a second isometric transformation. Modulating the encoded payload is based on QPSK or QAM.

In some implementations, execution of the instructions causes the device to encode the payload before scrambling, aggregate the scrambling key, and modulate the encoded payload, before scrambling the payload, based on QPSK or QAM. Scrambling the payload includes an isometric transformation of rotation and reflection of the QAM constellations of the modulated payload based on the aggregated scrambling key. Execution of the instructions may cause the device to aggregate the payload into a K-bit sequence using a K-bit aggregator (with K being a natural number that is greater than or equal to two), aggregate the scrambling key into an M-bit permutation index using an M-bit aggregator (with M being a natural number greater than K), permutate the K-bit sequence with the M-bit permutation index, encode the permutated sequence, and modulate the encoded sequence based on QPSK or QAM. Execution of the instructions may cause the device to generate a cyclic redundancy check (CRC) for media access control (MAC) layer information to be transmitted to the second device. The payload includes the MAC layer information and the CRC, and scrambling the payload includes scrambling only the CRC of the payload.

An example apparatus may include means for generating a scrambling key based on at least one of a freshness parameter or a private key. The private key is known by the apparatus and a second device. The method also includes scrambling a payload based on the scrambling key at a physical layer. A packet includes the payload for wireless transmission from the apparatus to the second device via a shared channel.

The apparatus may include means for encoding the payload before scrambling. Scrambling after encoding may be an isometric transformation. The apparatus may further include means for scrambling the payload with the scrambling key before encoding. In some implementations, the apparatus includes means for modulating the encoded payload after scrambling the encoded payload. Scrambling the encoded payload includes XOR'ing the encoded payload and the scrambling key, and modulating the encoded payload is based on Quadrature Phase-Shift Keying (QPSK) or Quadrature Amplitude Modulation (QAM). In some implementations, the apparatus includes means for encoding the payload before scrambling, means for modulating the scrambling key based on QPSK, and means for modulating the encoded payload before scrambling the encoded payload. Modulating the encoded payload is based on QPSK or QAM, and scrambling the modulated payload includes complex multiplication of the modulated payload and the modulated scrambling key.

In some implementations, the apparatus includes means for encoding the payload before scrambling, means for scrambling the encoded payload with the scrambling key, means for modulating the encoded payload after scrambling the encoded payload (wherein modulating the encoded payload is based on QPSK or QAM), means for modulating the scrambling key based on QPSK, and means for scrambling the modulated payload with the modulated scrambling key. Scrambling the encoded payload may be a first isometric transformation, and scrambling the modulated payload may be a second isometric transformation. Scrambling the encoded payload may include XOR'ing the encoded payload and the scrambling key, and scrambling the modulated payload may include multiplication of complex numbers of the modulated payload and the modulated scrambling key.

In some implementations, the apparatus includes means for encoding the payload before scrambling, means for aggregating the scrambling key, and means for modulating the encoded payload, before scrambling the payload, based on QPSK or QAM. Scrambling the payload may include an isometric transformation of rotation and reflection of the QAM constellations of the modulated payload based on the aggregated scrambling key. In some implementations, the apparatus includes means for aggregating the payload into a K-bit sequence using a K-bit aggregator (with K being a natural number greater than or equal to two), means for aggregating the scrambling key into an M-bit permutation index using an M-bit aggregator (with M being a natural number greater than K), means for permutating the K-bit sequence with the M-bit permutation index, encoding the permutated sequence, and means for modulating the encoded sequence based on QPSK or QAM. The apparatus may also include means for generating a cyclic redundancy check (CRC) for media access control (MAC) layer information to be transmitted to the second device. The payload may include the MAC layer information and the CRC, and scrambling the payload may include scrambling only the CRC of the payload. In some implementations, the apparatus is or included in a base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

DETAILED DESCRIPTION

Figure 1:
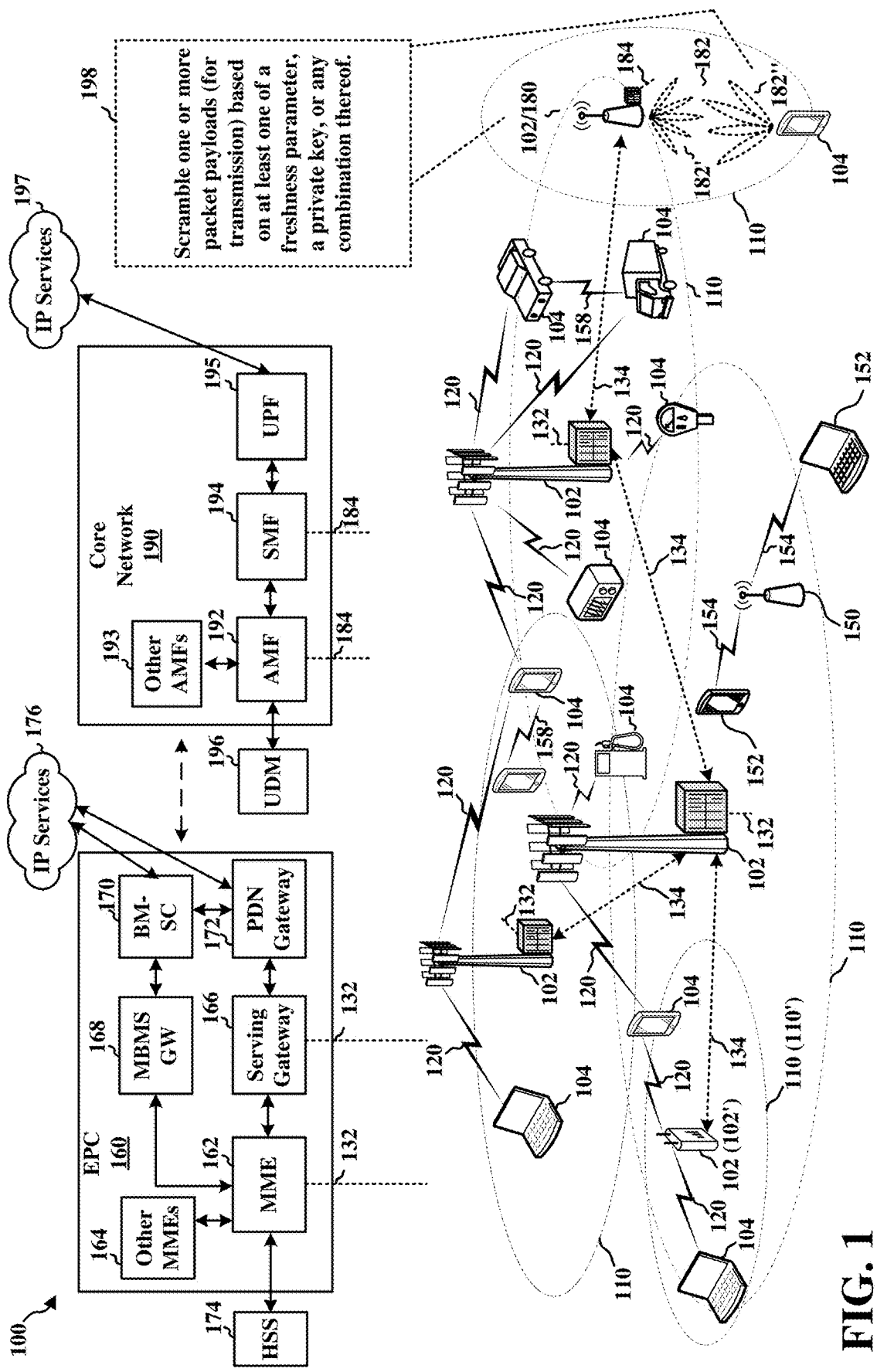
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Scrambling is used for wireless communications to allow receiving devices to identify packets associated with, e.g., a specific user equipment, base station, packet type, etc., at the physical layer. Security of wireless communications is a growing concern as more sophisticated snooping methods and deciphering attacks are created. However, typical scrambling methods may be susceptible to sophisticated means of deciphering by unintended recipients, as typical scrambling is performed using a publicly available form of a radio network temporary identifier (RNTI) and network time-slot. For example, a snooping device may be able to reverse engineer the scrambling to decipher packet information based on listening to packets between a base station and user equipment over time. In some implementations, scrambling may be used to provide a form of encryption to protect packet payloads from being deciphered and/or altered.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 and/or a base station 180 may be configured to scramble one or more packet payloads for transmission based on at least one of a freshness parameter, a private key known to the UE 104 and the base station 180, or any combination thereof (198). In some implementations, a base station (such as the base station 180) is configured to scramble packet payloads, as described herein, for a physical downlink control channel or physical downlink shared channel. While the examples herein are described with respect to a base station performing scrambling for a physical downlink control channel or a physical downlink shared channel, other devices may be configured to perform similar scrambling (including a UE) and for channels or links between devices other than a physical downlink control channel or physical downlink shared channel. Further, although the description herein may be focused on 5G NR, the concepts described may be applicable to other areas, such as but not limited to LTE, LTE-A, CDMA, GSM, and other wireless technologies.

FIG. 2A is a diagram 200 illustrating an example of a first subframe within a 5G NR (which may be referred to as 5G, NR, or 5G/NR herein) frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A and 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3 and 4 are shown with slot formats 34 and 28, respectively, any particular subframe may be configured with any of the various available slot formats 0-61. Slot formats 0 and 1 are all DL and UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots (of a specific slot-time or duration). Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH (such as system information blocks (SIBs)), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
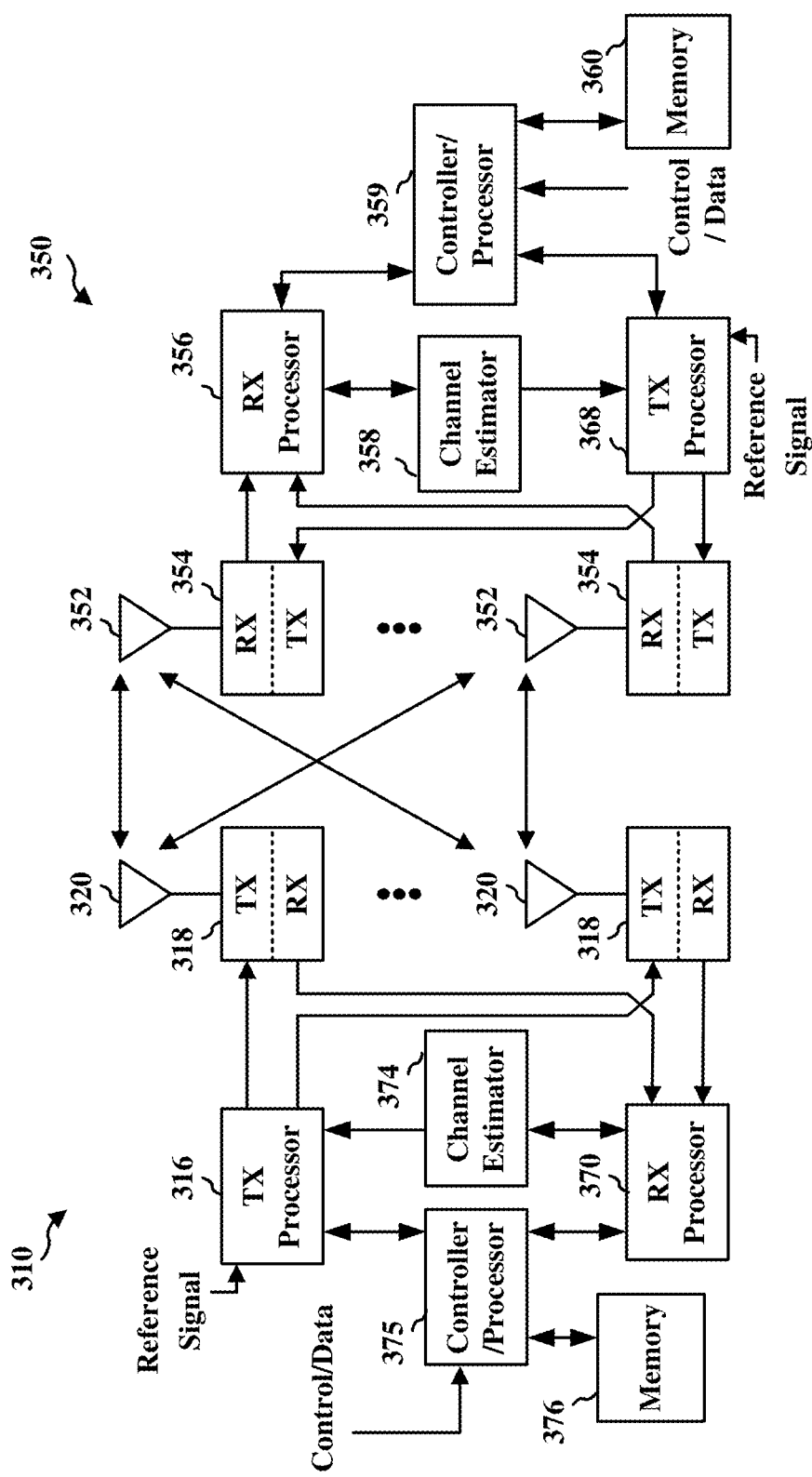
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, scrambling/descrambling of payloads, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350 (such as, e.g., decoding, demodulation, and/or descrambling). If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved (including, e.g., descrambling) to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering/descrambling, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Information to be wirelessly communicated (such as for LTE and NR based communications) is encoded and mapped, at the PHY layer, to one or more wireless channels for transmission. The information may also be scrambled at the PHY layer so that recipients may use the scrambling to differentiate the information based on, e.g., the intended recipient or the type of information. As such, the scrambling sequence is known to both the transmitter and the intended recipient.

Figure 4:
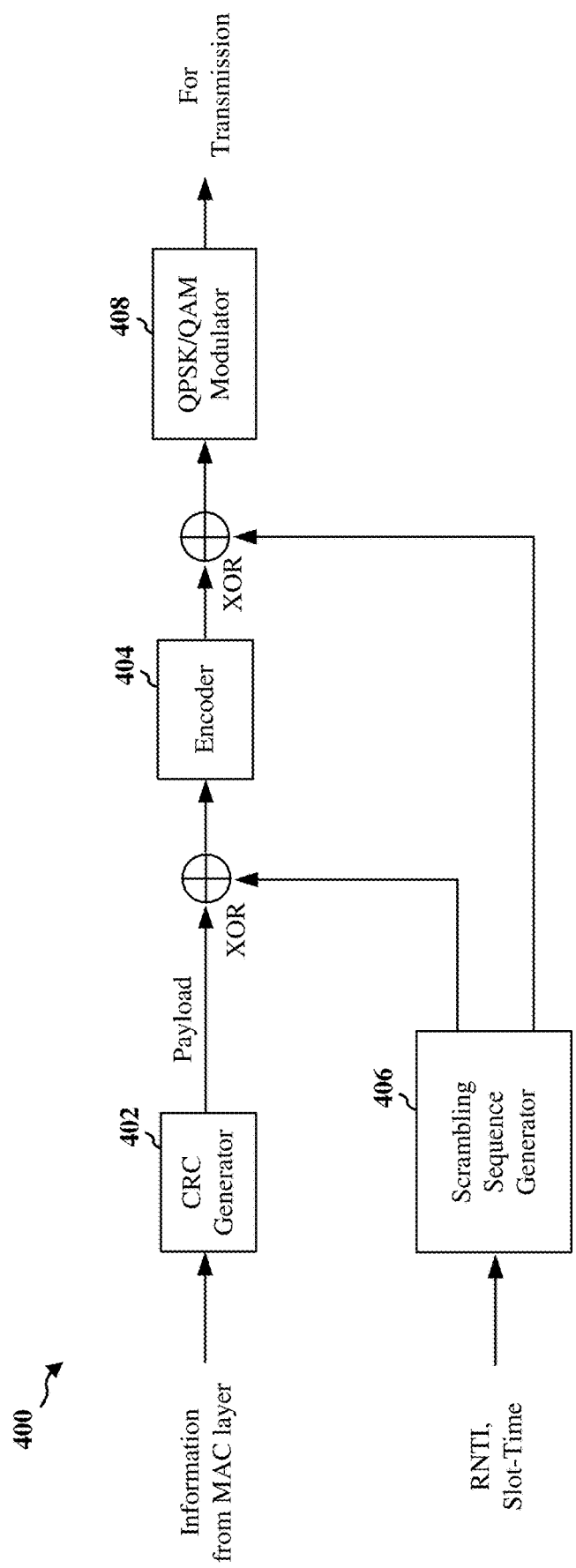
FIG. 4 is a diagram illustrating an example encoding process for physical downlink control channel (PDCCH) information or physical downlink shared channel (PDSCH) information at the physical (PHY) layer of a base station.

FIG. 4 is a diagram illustrating an example encoding process 400 for PDCCH or PDSCH information at the PHY layer of a base station. The example encoding process 400 may be implemented in, e.g., the base station 310 in FIG. 3. For example, the TX processor 316 of the base station 310 may be configured to perform the operations of the encoding process 400. In some implementations, the TX processor 316 may execute instructions stored in a memory coupled to the TX processor 316 to perform one or more operations of the process 400. In some other implementations, the base station 310 or TX processor 316 may include hardware (such as one or more integrated circuits) configured to perform one or more operations of the process 400. For example, one or more components of the below examples to perform encoding, modulation, and scrambling may be embodied in one or more integrated circuits including discrete components. In a specific example, the one or more components may be embodied in a PHY layer microcontroller including circuits to perform the operations. In some further implementations, the base station 310 may include a combination of hardware and software to perform the operations. As such, the components of encoding (including scrambling and modulation) at the PHY layer may be implemented in any suitable manner by a device. Key generation may occur at any suitable layer of the device and by any suitable component (including hardware and/or software). While the below examples are described with respect to a base station encoding information and a UE decoding information, other suitable implementations may exist (including the UE encoding information for transmission to the base station, and the base station decoding the information).

As shown in FIG. 4, the example encoding process 400 includes scrambling and modulation for mapping the information for transmission. A Cyclic Redundancy Check (CRC) generator 402 may receive MAC layer information to be transmitted by the base station. The CRC generator 402 may generate a CRC based on the received information, and combine the MAC layer information and the CRC (such as append the CRC to the MAC layer information) to generate a payload. The MAC layer information may be any suitable information, such as user data or control information (e.g., DCI, MIB, SIBs, etc.).

A scrambling sequence generator 406 may generate a scrambling sequence based on an RNTI (such as a Paging RNTI (R-RNTI), System Information RNTI (SI-RNTI), Single Cell RNTI (SC-RNTI), or another suitable RNTI (such as an RNTI of the target UE(s))). In some implementations, the scrambling sequence may also be based on a slot-time for the network. The payload may be scrambled with the scrambling sequence. For example, the scrambling sequence may be XOR'd with the payload, and the payload XOR'd with the scrambling sequence may be provided to the encoder 404.

In some implementations of scrambling the payload, only a portion of the payload is scrambled. For example, only the CRC (or other suitable error correcting code) may be scrambled. In another example, only the information is scrambled. In some other implementations, the entire payload may be scrambled.

The encoder 404 encodes the payload in any suitable manner to facilitate error correction and reliable reception of payloads by the recipient UE in the presence of noise or interference (including fading) associated with the wireless channel of the link to transmit the information. For example, the encoder 404 may be a turbo encoder, a low-density parity-check (LDPC) encoder, a tail-biting convolutional code (TBCC) encoder, a polar encoder, etc.

The encoded payload is then scrambled with the scrambling sequence (such as being XOR'd with the scrambling sequence). The QPSK/QAM modulator 408 then modulates the scrambled/encoded payload (based on QPSK or a suitable quadrature amplitude modulation (QAM)), mapping the information to a constellation for transmission by the base station on a physical link with a UE (such as a wireless link for the PDCCH or PDSCH, or another suitable wireless link).

Figure 5:
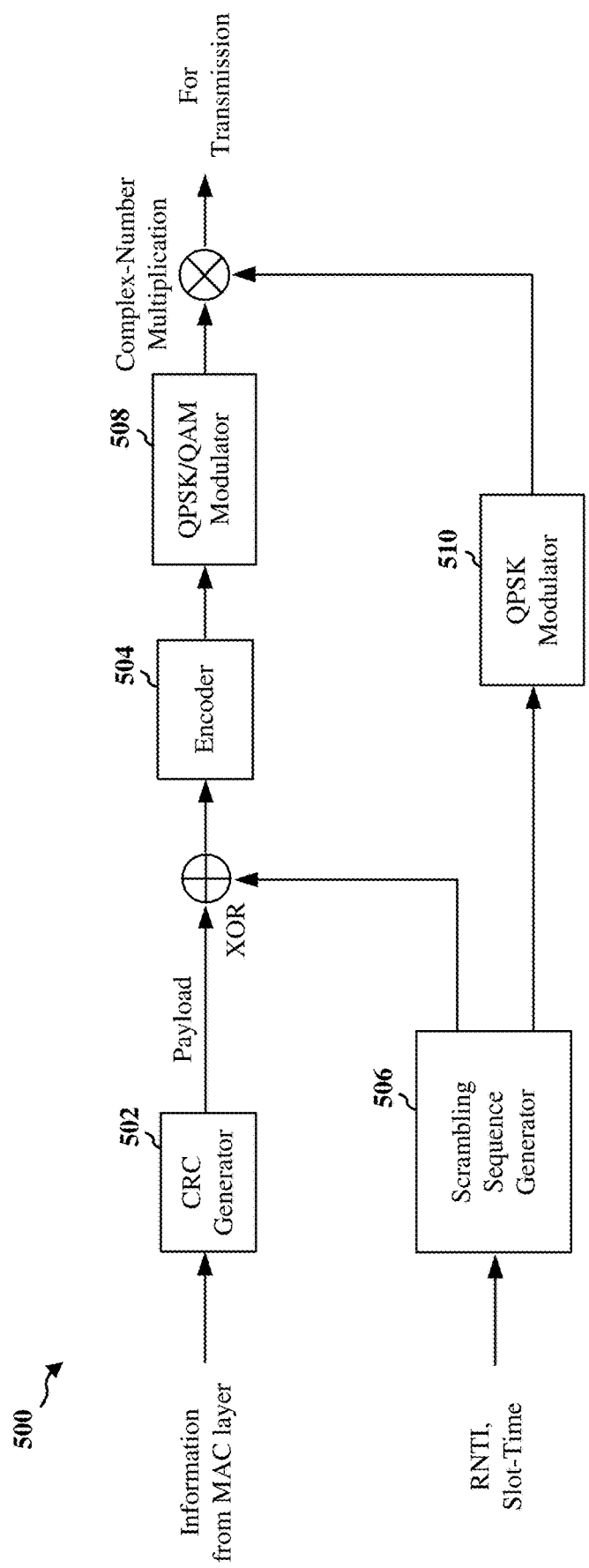
FIG. 5 is a diagram illustrating another example encoding process for PDCCH information or PDSCH information at the PHY layer of a base station.

FIG. 5 is a diagram illustrating another example encoding process 500 for PDCCH or PDSCH information at the PHY layer of a base station. In contrast to FIG. 4, modulation may be performed before scrambling the encoded payload. Similar to the process 400, the CRC generator 502 may generate a CRC for the MAC layer information to be transmitted, and the MAC layer information and the CRC may be combined to generate the payload. A scrambling sequence generator 506 may generate a scrambling sequence based on an RNTI and, in some implementations, a slot-time for the network. The payload may be scrambled with the scrambling sequence (such as at least a portion of the payload being XOR'd with the scrambling sequence), and the encoder 504 may encode the scrambled payload in any suitable manner. The QPSK/QAM modulator 508 may modulate the encoded payload, and the modulated payload may again be scrambled based on the scrambling sequence. For example, the QPSK modulator 510 may modulate the scrambling sequence based on QPSK, and the modulated payload and the modulated scrambling sequence may be multiplied together (which may be performed through a multiplication process of complex numbers corresponding to the modulated payload and the modulated scrambling sequence). The product may then be ready for transmission by the base station via a physical link to the UE (such as a wireless link for the PDCCH or PDSCH, or another suitable wireless link).

In some implementations, the scrambling sequence generator 506 generating a scrambling sequence may include the scrambling sequence generator 506 generating a first scrambling sequence and a second scrambling sequence for the different scrambling operations of the encoding process 400 in FIG. 4 or the encoding process 500 in FIG. 5. For example, a first scrambling sequence may be XOR'd with the payload before encoding in FIGS. 4 and 5. A second scrambling sequence may be XOR'd with the encoded payload (as shown in in FIG. 4) or may be modulated and multiplied with the modulated payload (as shown in FIG. 5). The encoding processes 400 and 500 may be logically equivalent, as an XOR operation of two inputs before modulation may be equivalent to a complex multiplication operation after modulation of the two inputs.

The scrambling operations XOR and complex multiplication are invariant, isometric transformations of the QAM constellation. In this manner, the spacing between constellation points is not altered (thus not further complicating error correction of the signal at the receiver). For example, an XOR operation generates a reflection of the constellation, and a complex multiplication operation rotates the constellation a multiple of 90 degrees (e.g., 90 degrees, 180 degrees, or 270 degrees).

The purpose of scrambling in the encoding process 400 or 500 may be for, by the intended receiver, detection of messages sent over a common channel (such as the PDCCH or PDSCH) without parsing the information in the payload and/or interference averaging. Since the means for generating the scrambling sequence at the base station for transmission of the information is known at the UE receiving the information, the UE may be configured to decode the received information (including demodulation and descrambling) in a reverse order of encoding the information by the base station.

As shown in FIG. 4 and FIG. 5, the scrambling sequence may be generated based on an RNTI and, in some implementations, a slot-time for the network. The slot-time may be any suitable time associated with one or more slots for transmitting the packet over a wireless channel (e.g., a time at which a defined slot associated with transmission of the packet exists).

However, an RNTI may be known or determined by eavesdropping on the wireless link. As a result, a device may listen to the modulated signal being transmitted to determine the cipher text of frequent packets being sent. The device may then be able to determine the cipher used for generating the scrambling sequence from the RNTI.

If a device has enough information regarding the sequence-generation for scrambling, the device may act as a fake base station through an overshadowing attack. For example, the device may be able to transmit packets that appear legitimate as from the base station but with a payload to be injected into a UE. In this manner, the device may transmit the "fake" packets such that the received signal strength of the fake packets is much higher than the received signal strength of the true packets (from the base station) at the UE (which is based on the distance between the device and the receiver and the transmit power at the device for the fake packets). In this manner, the signal from the base station to the UE may appear as noise or irrelevant compared to the signal from the device acting as a fake base station.

A device may also perform a bit-flipping (or symbol-flipping) attack (focusing on the XOR scrambling operation), which does not require knowledge of the scrambling sequence. In this manner, a third device may act as a man in the middle between the UE and the base station such that both devices are unaware of the third device being in the transmit path. The third device may receive a packet from one device and flip one or more symbols to generate a new packet before sending the new packet to the other device. For deterministic flipping, the third device may be configured to flip one or more specific symbols to cause a defined action. For indeterministic flipping, the third device may flip one or more symbols in a trial and error manner (such as an attempt to determine more information about the scrambling techniques between the base station and the UE, or to create a Denial of Service (DoS) style attack).

Encryption and other security measures may be performed at upper layers of devices (such as by an applications processor). However, a receiver may be tricked into decoding a fake packet and process the payload until determined at an upper layer that the packet is fake. As such, receiving and processing resources may be utilized. As a result, while upper layer security measures may prevent the injection of malicious code into operations of, e.g., a UE, the resources of the UE may become unavailable as a result of processing packets not from the base station. In this manner, a device acting as a fake base station may perform an attack similar to a DoS attack on the UE by tying up the resources of the UE. Additionally, the payloads of fake packets may be crafted to pass through processing at upper layers unobserved by security measures. Security in encoding information for transmission and decoding information at reception may be implemented at the PHY layer to prevent or reduce such concerns.

A device may be configured to perform scrambling at the PHY layer that provides additional security against attacks by other devices. For example, a base station may implement a modified scrambling process at the PHY layer to prevent attacks by a fake base station. In some implementations, a device may generate a scrambling key based on parameters other than an RNTI, and the device may use the scrambling key to scramble a payload at the PHY layer.

One example parameter for generating a scrambling key may be a private key known, e.g., only to the base station and the UE. A private key may be a private sequence, code, etc. or any suitable means for generating the key. In some implementations, the base station may provide the private key to a UE during or after the UE connects with the base station. For example, when a connection is established between a UE and a base station in the network, a private message including the private key may be communicated from the base station to the UE. In some other implementations, the key may be stored in the UE and base station before the UE connects to the base station, a user may manually enter the private key or a private key identifier into the UE for the UE to determine the private key, the private key may be communicated via a separate backhaul or communication link by the base station or a central device storing the private keys, etc. Any suitable private key may be used (such as a 64-bit, 128-bit, 256-bit code, etc., a binary code, hexadecimal code, or other modulus codes, a static code, a dynamic code (such as a rolling code), and so on).

In some implementations, the private key may replace the RNTI for generating a scrambling key. In some other implementations, the private key may be in addition to the RNTI for generating a scrambling key. A scrambling sequence generator (such as the scrambling sequence generator 406 in FIG. 4 and the scrambling sequence generator 506 in FIG. 5) may be used to generate the scrambling key based on the private key. In some other implementations, the scrambling sequence generator may be adjusted to incorporate a private key as an additional parameter.

Scrambling using private/secret key (e.g., known only to the legitimate base station and UEs) may cause wireless communications to be more secure than if scrambling using a scrambling sequence based on an RNTI. For example, the structure of the RNTI, and some of the information in the RNTI, may be known. As a result, a device listening to the wireless channel may decipher at least a portion of a scrambling sequence based on the known information about the RNTI. On the other hand, the private key is an unknown value, but may also be an unknown length and/or an unknown format. In this manner, a listening device would have a more difficult time determining the scrambling key to decipher information in wireless communications.

As noted, scrambling payloads based on a private/secret key used to generate the scrambling key makes deciphering more difficult for a listening device. However, a listening device may still inject itself between the base station and the UE as a fake base station. For example, a device may receive a packet from the base station, flip one or more symbols of the packet, and transmit the new packet to the UE as if it is the originally sent packet. In this manner, the fake base station may attempt, e.g., to cause the UE to respond with a known packet type or request based on the communication protocol. The fake base station may then attempt to reverse engineer the scrambling code or cipher text in the packet to known text. In the above attempts, the transmission from the fake base station to the UE is later than the transmission from the base station to the UE.

Another example parameter for generating a scrambling key may be a freshness parameter. A scrambling based on a freshness parameter may indicate whether a packet addressed to the UE is stale. For example, if the signal of the scrambled packet indicates a system time, and a threshold amount of time passes after the system time before reception at the UE, the UE may be able to determine at the PHY layer that the packet is stale or invalid (and thus disregard the packet). The freshness parameter may be any suitable parameter, such as a system frame number (SFN), a Hyper SFN (HFN), or another indicator of a system time. In another example, the freshness parameter may be the slot-time or associated with a slot-time. The threshold may be any suitable length of time, such as a frame length.

In some implementations, the private key may include a freshness parameter or indicator. For example, the private key may be a dynamic key based on a synchronized system time between the UE and the base station. In this manner, a scrambling based on such a private key may allow a UE to determine the freshness of a received packet.

Figure 6:
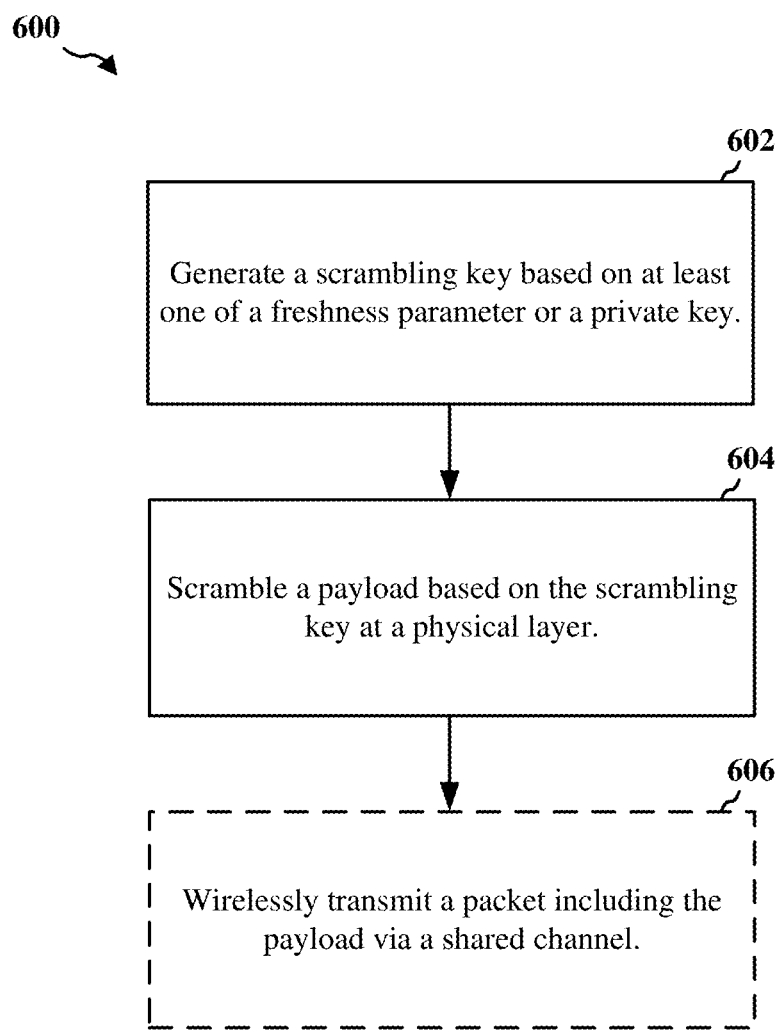
FIG. 6 is a flowchart of an example method of preparing data at the PHY layer for transmission.

FIG. 6 is a flowchart 600 of an example method of preparing data at the PHY layer for transmission. In some implementations, the method may be performed by a base station encoding PDCCH or PDSCH information at the PHY layer. The base station may be, e.g., the base station 102 or 180 in FIG. 1 or the base station 310 in FIG. 3.

At 602, the base station may generate a scrambling key based on at least one of a freshness parameter or a private key. For example, the base station may generate a scrambling key using a private key in lieu of an RNTI. The base station may then scramble a payload based on the scrambling key (604). For example, referring to FIG. 3, the TX processor 316 may receive MAC layer information from the controller/processor 375, append an error correction code (such as CRC) to the information to generate the payload, and scramble the payload based on the scrambling key. As noted herein, scrambling may be performed for the entire payload or a portion of the payload (such as the CRC of the payload).

Other processes may be performed, which are not shown, such as encoding, modulation/channel mapping, etc. In some implementations, the base station may then wirelessly transmit a packet including the payload via a shared channel with the UE (606). For example, the packet may be DCI or other information transmitted on the PDCCH. In another example, the packet may contain user specific information transmitted on the PDSCH.

In some implementations, the payload may be scrambled twice. Additionally, the payload may be scrambled at least once after encoding (such as via turbo encoding, polar encoding, LDPC encoding, etc.). Scrambling may also occur before or after modulation. Furthermore, the scrambling operations may be isometric operations so as to not change spacings between constellation points for modulation.

Figure 7:
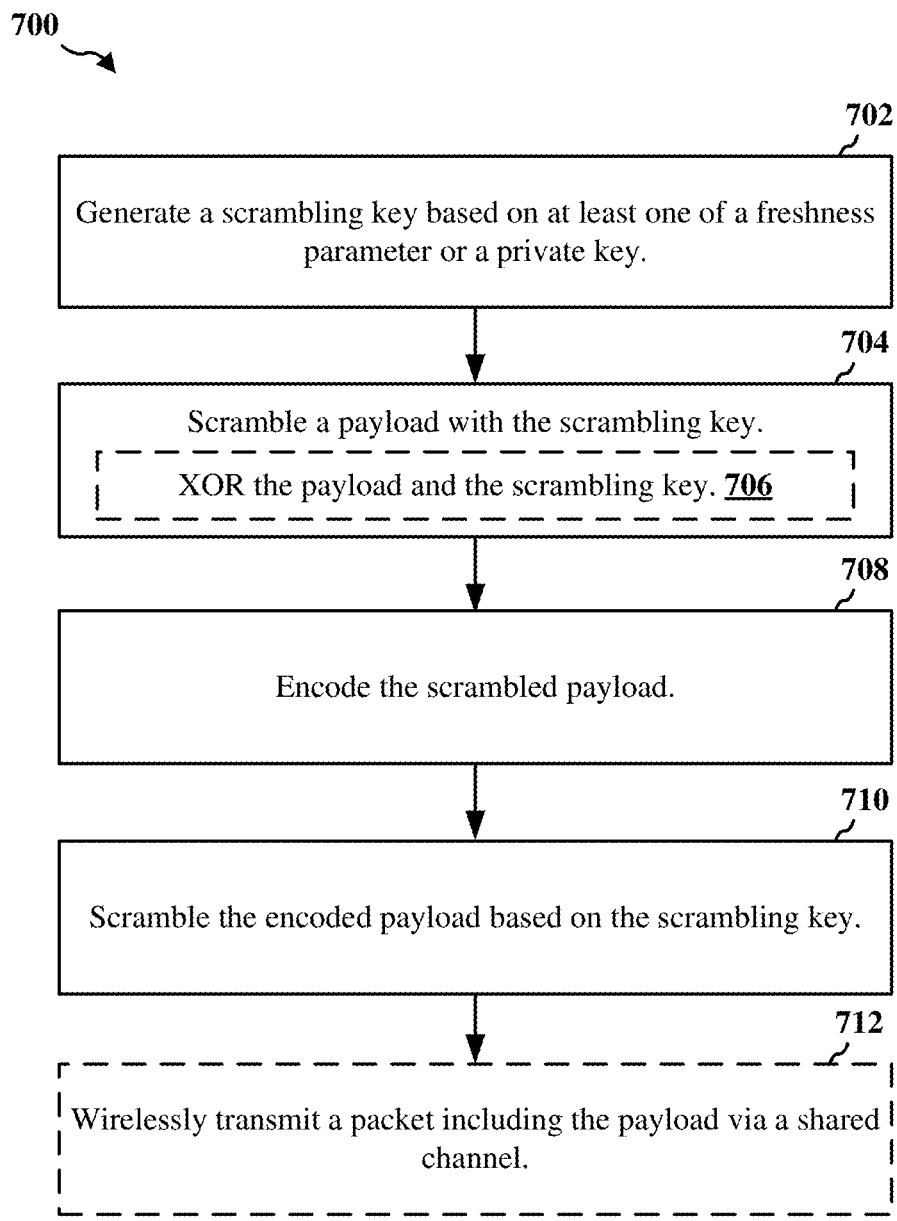
FIG. 7 is a flowchart of another example method of preparing data at the PHY layer for transmission.

FIG. 7 is a flowchart 700 of another example method of preparing data at the PHY layer for transmission. The method illustrated in FIG. 7 may be an example implementation of the method illustrated in FIG. 6. At 702, the base station may generate a scrambling key based on at least one of a freshness parameter or a private key (similar to 602 in FIG. 6). The base station may then scramble a payload with the scrambling key (704). For example, the payload may be MAC layer information and CRC (or other suitable error correction code). In some implementations, the base station may XOR the payload (such as the MAC layer information and CRC) and the scrambling key (706). The base station may encode the scrambled payload (708), and the base station may again scramble the encoded payload based on the scrambling key (710). In some implementations, the base station may XOR the encoded payload and the scrambling sequence, and then the base station may modulate the scrambled, encoded payload. In some other implementations, scrambling may be performed after modulating the encoded payload. In some implementations, the base station may then wirelessly transmit the packet including the payload via a shared channel (712).

In some implementations, the scrambling key in step 710 and in step 704 is the same scrambling key. In some other implementations, the scrambling key may include a first key (used for the first scrambling) and a second key (used for the second scrambling). Scrambling with/using/based on a scrambling key may refer to the use of the same key or different keys as part of the scrambling key.

Figure 8:
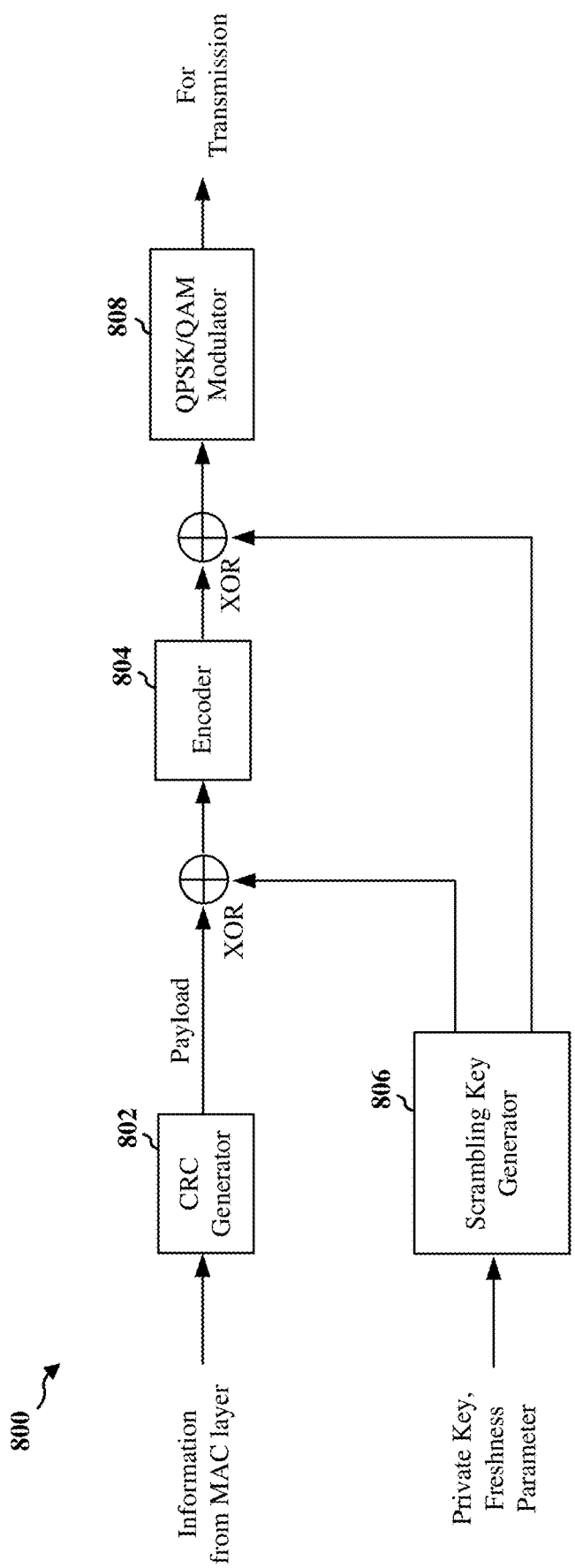
FIG. 8 is a diagram illustrating an example encoding process for information (such as PDCCH information or PDSCH information) at the PHY layer of a device (such as a base station).
Figure 9:
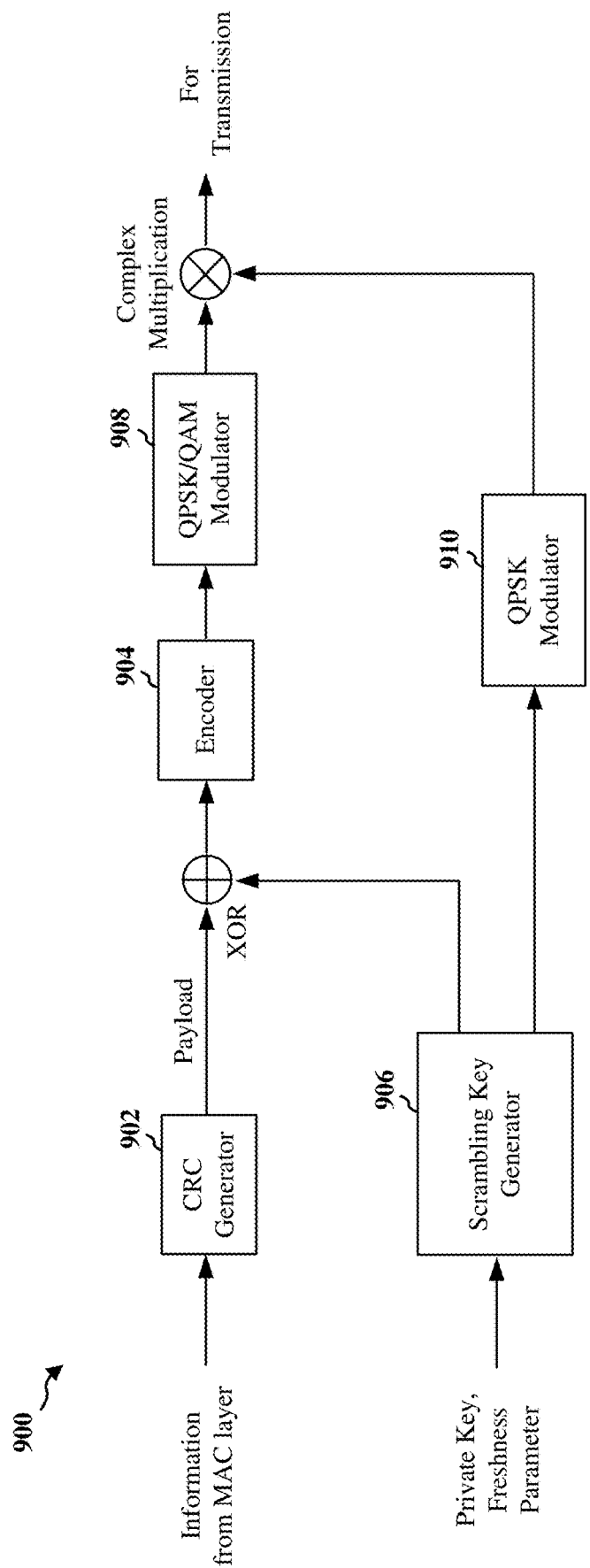
FIG. 9 is a diagram illustrating another example encoding process for information at the PHY layer of a device.

As noted, the scrambling in 710 may be performed before modulation or after modulation. FIG. 8 and FIG. 9 depict different implementations of the encoding process. In comparing FIG. 8 and FIG. 9, a second scrambling is either performed before or after modulation. While the diagrams in FIG. 8 and FIG. 9 are illustrated as regarding PDCCH or PDSCH information from a base station, the illustrated processes may apply to other channels or information or other transmitting devices (such as a UE).

FIG. 8 is a diagram illustrating an example encoding process 800 for PDCCH or PDSCH information at the PHY layer of a base station. The encoding process 800 may be similar to the encoding process 400 in FIG. 4, except the scrambling key generator 806 generates a scrambling key based on a private key and a freshness parameter. The CRC Generator 802 may generate a CRC for the MAC layer information, and the MAC layer information and the CRC may together be the payload. The payload may be scrambled (such as XOR'd) with the scrambling key, and the encoder 804 may encode the scrambled payload. As noted above, scrambling may be of the entire payload or only a portion of the payload.

The encoded payload may then again be scrambled (such as XOR'd) with the scrambling key, and the modulator 808 may modulate the scrambled, encoded payload (such as based on QPSK or QAM). As noted above, the first scrambling and the second scrambling may be based on the same scrambling key, or may be based on a first key and a second key of the scrambling key.

FIG. 9 is a diagram illustrating another example encoding process 900 for PDCCH or PDSCH information at the PHY layer of a base station. The encoding process 900 may be similar to the encoding process 500 in FIG. 5, except the scrambling key generator 906 generates a scrambling key based on a private key and a freshness parameter (similar to scrambling key generator 806 in FIG. 8). The CRC Generator 902 may generate a CRC for the MAC layer information, and the MAC layer information and the CRC may together be the payload. The payload may be scrambled (such as XOR'd) with the scrambling key, and the encoder 904 may encode the scrambled payload.

In contrast to the encoding process 800 in FIG. 8, the encoded payload is modulated before scrambled again. For example, the modulator 908 modulates the encoded payload (based on, e.g., QPSK or QAM). Additionally, the modulator 910 modulates the scrambling key (based on e.g., QPSK). The modulated payload is then scrambled with the modulated scrambling key. Quadrature-based modulating of the scrambling key may transform a number sequence into a sequence of complex numbers. In this manner, the scrambling may be complex multiplication of the modulated payload and the modulated scrambling key. As noted above, the first scrambling and the second scrambling may be based on the same scrambling key, or may be based on a first key and a second key of the scrambling key. If based on different keys of the scrambling key, the second scrambling key may be modulated for the second scrambling.

The example encoding processes illustrated in FIG. 8 and FIG. 9 may prevent a Known Plain-Text Attack (KPA) from another device. However, a device may be able to perform time-shifting while acting as a fake base station. For example, the fake base station may adjust the signal such that the time indicated by the signal is later than the actual system time. In this manner, the UE may be unaware of the staleness of a packet, as the signal may appear to still be fresh (e.g., less than the threshold amount of time from a system time of transmission of the signal by the base station). As a result, the UE may be unable to correctly determine freshness of a packet based on the scrambling, and the fake base station may have time to receive the signal from the actual base station, demodulate the signal, and attempt to recover the scrambling key.

If the fake base station knows a portion of the payload, the fake base station may recover the scrambling key by XOR'ing the received encoder output (after demodulation) with the known portion of the payload. The fake base station may then generate valid PDCCH or PDSCH signals for the UE based on the recovered scrambling key. Such an attack may be referred to as a time-shifting overshadowing attack.

As noted in the time-shifting overshadowing attack, the fake base station may be required to know at least a portion of the plain-text of the payload to recover the scrambling key. In some attacks, though, a fake base station may not be required to know a portion of the plain-text of the payload. For example, a fake base station may perform a time-shifting bit-flipping (or symbol-flipping) attack. As noted above, time-shifting may cause a UE to incorrectly determine that a stale packet is fresh based on the scrambling. In this manner, the fake base station may have time to receive a signal from the base station, flip one or more bits of the payload and thus generate a new signal that is transmitted to the UE. The fake base station may determine portions of the scrambling based on the UE responses caused by the bit-flipping.

A fake base station may take advantage of the associative property of the XOR operation and the linearity of the encoder through bit-flipping after modulation. In this manner, the fake base station does not need to know the plain-text of the payload and the scrambling key to change the signal to a new signal that remains valid. The associative property of XOR (which may be the scrambling operation) and the linearity of the channel encoder is illustrated in the equivalences shown in equation (1) below:

$$E(x')\text{XOR}(E(x)\text{XOR}s) = (E(x')\text{XOR}E(x))\text{XOR}s = E(x'\text{XOR}x)\text{XOR}s \quad (1)$$

Function E( ) represents encoding by the channel encoder. x represents the actual payload from the base station. s represents the scrambling key. x' represents the bit-flip sequence from the fake base station. As shown in equation (1), XOR'ing the encoded bit-flipping sequence with the scrambled, encoded payload is equivalent to (i) XOR'ing the encoded bit-flipping sequence and the encoded payload before scrambling and (ii) XOR'ing the bit-flipping sequence and the actual payload before encoding and scrambling. Therefore, the fake base station may introduce new data into the payload through bit-flipping without needing to know the plain-text of the payload or the scrambling.

In some implementations, a payload may be scrambled twice after encoding. For example, two isometric transformations of the QAM constellation may be performed. As a result of two transformations after encoding the payload, a fake base station would be required to observe two snapshots of a scrambled version of a plain-text of the payload. However, since a freshness parameter may be used for generating a scrambling key, a scrambling key may not be used multiple times. In this manner, the same plain-text of a payload will not be scrambled twice with the same scrambling key.

In some further implementations, one of the scrambling operations is complex multiplication (such as for scrambling after modulation). The combination of an XOR operation and complex multiplication for two scrambling operations does not satisfy the associative property (unlike the XOR operation itself). For example, the XOR operation is a bit-based operation, and complex multiplication is a multiple-bit operation. The combination of the two operations (with different size inputs) thus does not satisfy the associative property (and the properties of equation (1) do not apply). In this manner, the base station and UE become resilient against time-shifting attacks (including bit-flipping and overshadowing attacks as described above).

Figure 10:
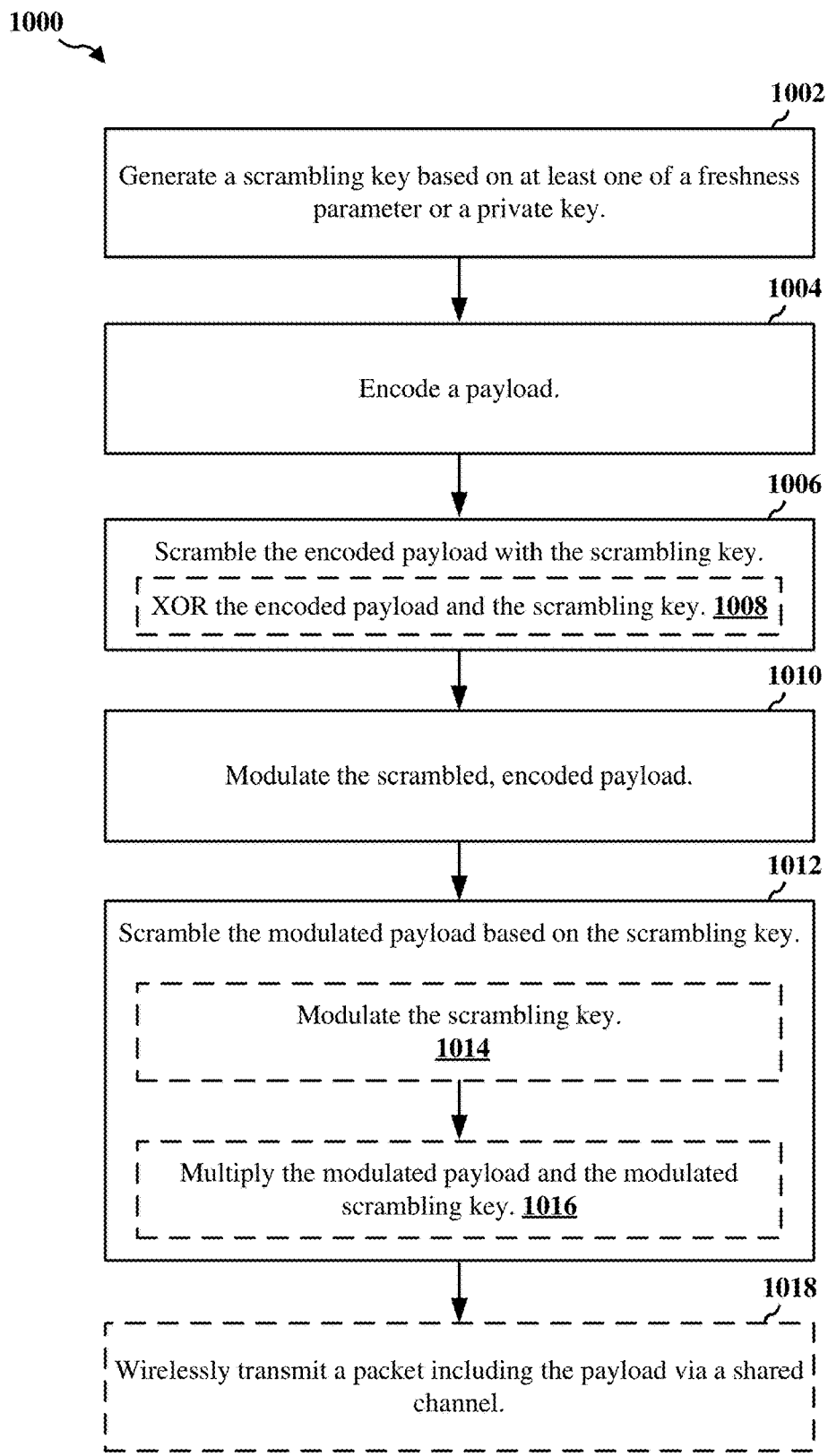
FIG. 10 is a flowchart of an example method of preparing data at the PHY layer for transmission.

FIG. 10 is a flowchart 1000 of an example method of a device (such as a base station) preparing data at the PHY layer for transmission (such as PDCCH or PDSCH information). At 1002, the base station may generate a scrambling key based on at least one of a freshness parameter or a private key. 1002 may be similar to 602 in FIGS. 6 and 702 in FIG. 7. The base station may also encode a payload (1004). After encoding the payload, the base station may scramble the encoded payload with the scrambling key (1006). In some implementations, the base station may XOR the encoded payload and the scrambling key (1008).

The base station may then modulate the scrambled, encoded payload (1010). In some implementations, the modulation may be based on QPSK or QAM. At 1012, the base station may scramble the modulated payload based on the scrambling key. In some implementations, the base station may modulate the scrambling key (1014). For example, the modulation of the scrambling key may be based on QPSK. The base station may then multiply the modulated payload and the modulated scrambling key (1016). As noted above, the multiplication operation for the modulated data may be a multiplication of complex numbers. In some implementations, the base station may then wirelessly transmit the packet including the payload via a shared channel (1018).

In some implementations, the scrambling key in step 1006 and in step 1012 is the same scrambling key. In some other implementations, the scrambling key may include a first key used for the first scrambling) and a second key (used for the second scrambling). Scrambling with/using/based on a scrambling key may refer to the use of the same key or different keys as part of the scrambling key. If based on different keys of the scrambling key, the second scrambling key may be modulated for the scrambling at 1012.

Figure 11:
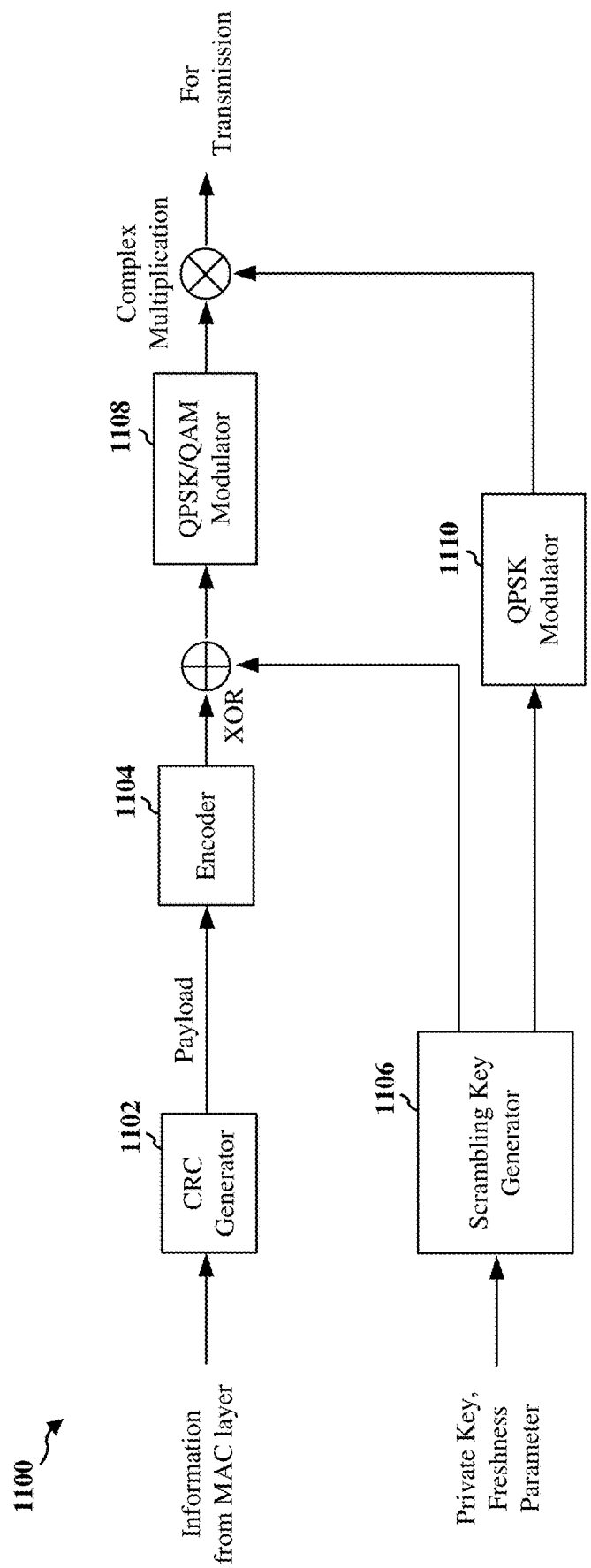
FIG. 11 is a diagram illustrating another example encoding process for information at the PHY layer of a device.

FIG. 11 is a diagram illustrating an example encoding process 1100 for PDCCH or PDSCH information at the PHY layer of a base station. The example encoding process 1100 may be an implementation of the method illustrated in FIG. 10. As shown, the CRC generator 1102 may generate a CRC for the MAC layer information. The encoder 1104 may then encode the payload (which may include the MAC layer information and the CRC). The scrambling key generator 1106 may generate a scrambling key based on at least one of a private key or a freshness parameter. The encoded payload may be XOR'd with the scrambling key, and the modulator 1108 may modulate the scrambled payload (such as based on QPSK or QAM). The modulator 1110 may modulate the scrambling key based on QPSK. The modulated payload and the modulated scrambling key may then be multiplied.

While the example method illustrated in FIG. 10 and the example encoding process 1100 in FIG. 11 illustrate scrambling as occurring exclusively after encoding, in some implementations, a scrambling operation may also occur before encoding. For example, a scrambling operation before encoding may exist to scramble the CRC portion of the payload. In some implementations, a scrambling operation before encoding is not shown for clarity in explaining the examples. As such, other suitable implementations may exist, and the disclosure is not limited to the examples in FIG. 10 and FIG. 11.

Two scrambling operations after encoding (with one scrambling operation being a reflection and the other scrambling operation being a rotation of the QAM constellation) may prevent a base station from being susceptible to time-shifting overshadowing and bit-flipping attacks (in addition to basic bit-flipping and overshadowing attacks). Additionally, with the modulations being quadrature based, XOR and complex multiplication are scrambling operations that are isometric transformations of the constellation that do not change the spacing between constellation points. For example, an XOR operation may generate a reflection of the constellation, and a complex multiplication operation may rotate the constellation a multiple of 90 degrees (such as 90 degrees, 180 degrees, or 270 degrees).

As shown in FIG. 11, the reflection operation (XOR) occurs before modulation, and the rotation operation (complex multiplication) occurs after modulation. In some implementations, the isometric transformations of reflection and rotation may both occur after modulation of the payload.

Figure 12:
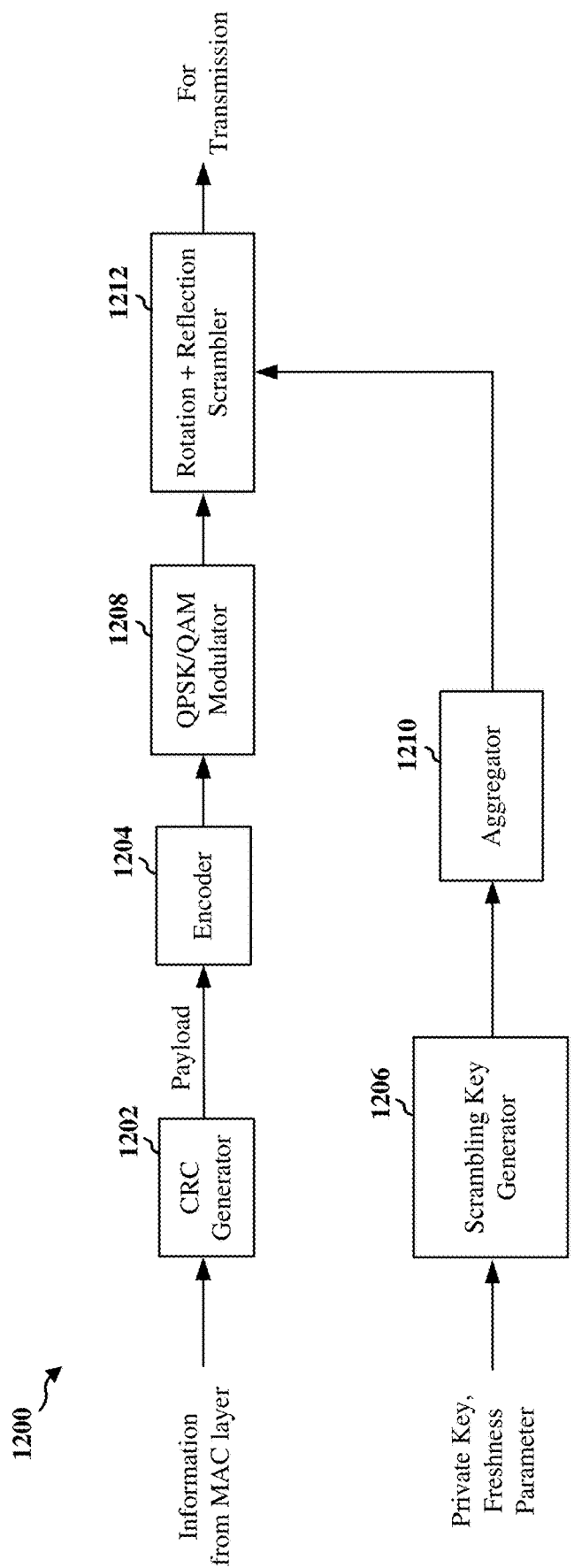
FIG. 12 is a diagram illustrating a further example encoding process for information at the PHY layer of a device.

FIG. 12 is a diagram illustrating an example encoding process 1200 for PDCCH or PDSCH information at the PHY layer of a base station. The encoding process 1200 may be similar or equivalent to the encoding process 1100 in FIG. 11, except that the one or more isometric transformations of the constellation may occur after modulation. In some implementations, the encoding process 1200 in FIG. 12 may be configured to output the same modulated, scrambled payload as the encoding process 1100 in FIG. 11. As noted herein, the scrambling operations may be isometric transformations of the constellation to not introduce performance-loss for error detection and correction during the decoding process at the receiving device (such as the UE).

Referring to FIG. 12, the CRC generator 1202 may generate a CRC for the MAC layer information (with the MAC layer information and CRC together being the payload). The encoder 1204 may encode the payload, and the modulator 1208 may modulate the encoded payload (such as based on QPSK or QAM). The scrambling key generator 1206 may generate a scrambling key based on at least one of a private key or a freshness parameter.

As noted above, if multiple scrambling operations occur at different points in the encoding process (e.g., encoding process 800 in FIG. 8, encoding process 900 in FIG. 9, and encoding process 1100 in FIG. 11), the scrambling key may include a first key for the first scrambling process and a second key for a second scrambling process. In some implementations, the scrambling key generator may continually or periodically generate a non-repeating sequence or stream that changes based on the freshness parameter. In this manner, a first key may be a first portion of the stream, and a second key may be a second portion of the stream (with the scrambling key including the first portion and the second portion of the stream).

The aggregator 1210 may aggregate a portion of the stream as the scrambling key to be used for scrambling the modulated data. The QAM constellation for the modulated payload may then be rotated and reflected by the scrambler 1212 using the scrambling key output from the aggregator 1210. As noted above, the scrambling 1212 is isometric operations performed on the modulated payload to preserve error detection and correction functionality during decoding.

Figure 13:
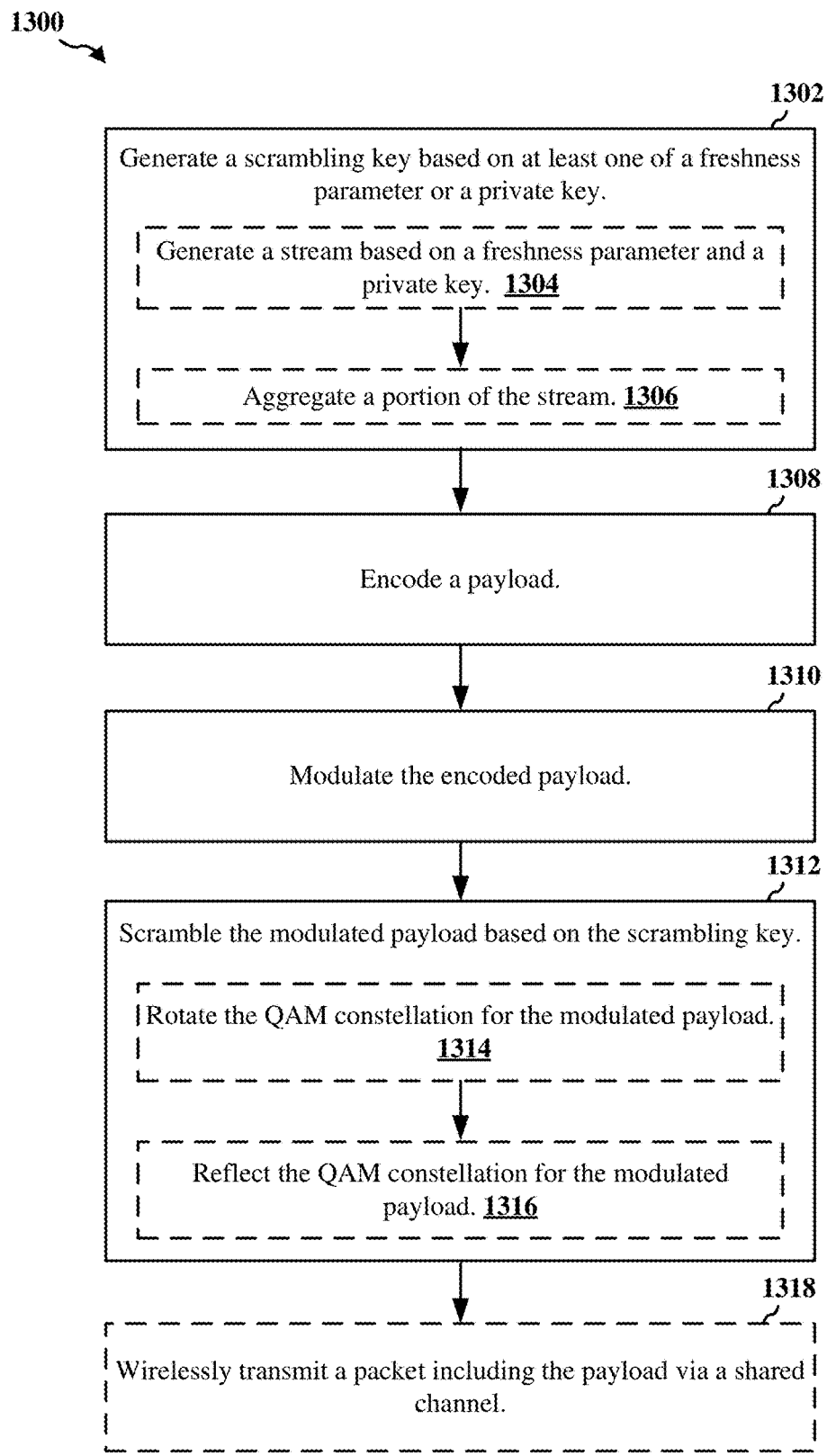
FIG. 13 is a flowchart of an example method of preparing data at the PHY layer for transmission.

FIG. 13 is a flowchart 1300 of an example method of a device (such as a base station) preparing data at the PHY layer for transmission (such as PDCCH or PDSCH information). The method illustrated in FIG. 13 may be an example implementation of the encoding process 1200 in FIG. 12. At 1302, the base station may generate a scrambling key based on at least one of a freshness parameter or a private key. In some implementations, the base station may generate a sequence/stream that is based on the private key and changes based on the freshness parameter (1304). The base station may then aggregate a portion of the sequence/stream for the scrambling key to be used for scrambling the payload (1306).

The base station may also encode the payload (1308), and the base station may modulate the encoded payload (1310). In some implementations, the modulation may be based on QPSK or QAM. The base station may then use the scrambling key (such as the modulated stream portion) to scramble the modulated payload (1312). In some implementations, the base station may determine what angle to rotate the constellation from the scrambling key, and rotate the constellation the determined angle (1314). The base station may also determine, based on the scrambling key, along which axis or axes to reflect the constellation, and reflect the constellation on the determined one or both axes (1316). Rotation and reflection may be performed in any suitable order for the isometric transformations of the constellation. In some implementations, the base station may then wirelessly transmit a packet including the payload (after the encoding process) via a shared channel (such as a PDCCH or a PDSCH) with the UE (1318).

While the encoding process 1200 in FIG. 12 (and the associated method illustrated in FIG. 13) show the reflection and rotation transformations occurring after encoding and modulating the payload, the scrambling operations may also occur before channel encoding. For example, an invertible operation on portions (a defined size number of bits) of the payload may be performed to scramble the payload, and the scrambled output may be encoded. The operation may be based on the scrambling key. For example, each portion of the payload may be permutated with a different portion of the scrambling key, such as discussed below with respect to FIG. 14 and FIG. 15.

Figure 14:
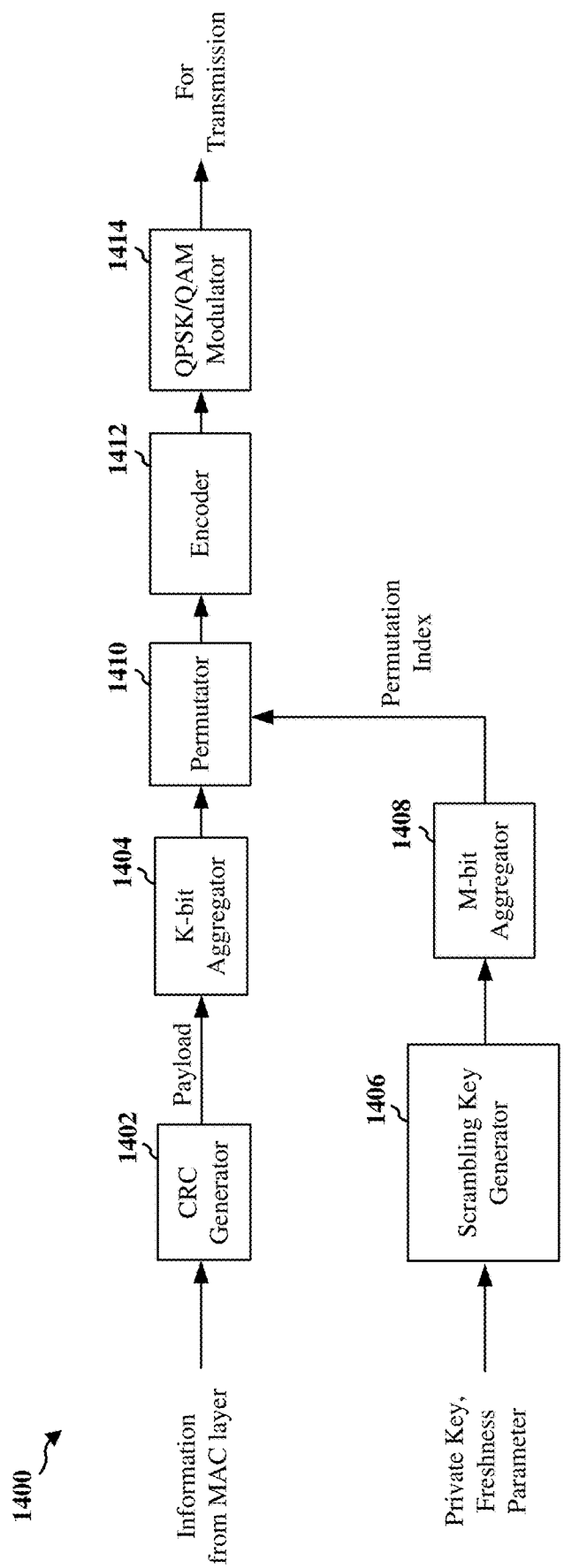
FIG. 14 is a diagram illustrating an example encoding process for information at the PHY layer of a device.

FIG. 14 is a diagram illustrating an example encoding process 1400 for PDCCH or PDSCH information at the PHY layer of a base station. The CRC generator 1402 may generate a CRC for the MAC layer information, and the MAC layer information and CRC together may be the payload. The K-bit aggregator 1404 may then divide the payload into K-bit size portions. For example, the payload may be received as a stream, and the K-bit aggregator may aggregate the payload stream for K-bits to generate K-bit portions of the payload.

The scrambling key generator 1406 may generate the scrambling key based on at least one of a private key or a freshness parameter. For example, the scrambling key generator 1406 may generate a sequence or stream based on the private key and changing based on the freshness parameter. The M-bit aggregator 1408 may then divide the sequence/stream from the scrambling key generator 1406 into M-bit portions (such as aggregating the scrambling key for M-bits at a time).

The permutator 1410 may scramble the payload using a permutation operation for each K-bit portion of the payload, with the specific permutation operation based on the M-bit portion of the scrambling key. For example, the value of the M-bit sequence may be a permutation index indicating the specific permutation of the bits in the K-bit payload sequence. In some implementations, the permutation of a K-bit sequence outputs a K-bit sequence.

Each K-bit portion of the payload includes the specific bits of the payloads. For example, a 4-bit payload portion may be "1010." 4-bits may have $2^K$ different values, with 1010 being the correct value for the payload. As such, the permutation operation may be in a $2^K$ space, with the permutation index used to permutate the input K-bit payload value to another K-bit payload value. K may be a natural number greater than or equal to two (so that at least two bits are input for a permutation operation). If K is two, then M may be a natural number up to four (as two bits may be four different values).

In some implementations, M is at least greater than K. In some other implementations, M be at greater than or equal to 2*K. However, M may be any suitable natural number up to floor ($\log_2(2^K!)$). In some implementations, the size of M may be large enough such that a freshness parameter may not be used in generating the scrambling key.

Referring back to FIG. 14, the encoder 1412 may encode the scrambled payload, and the modulator 1414 may modulate the encoded payload (such as based on QPSK or QAM).

Figure 15:
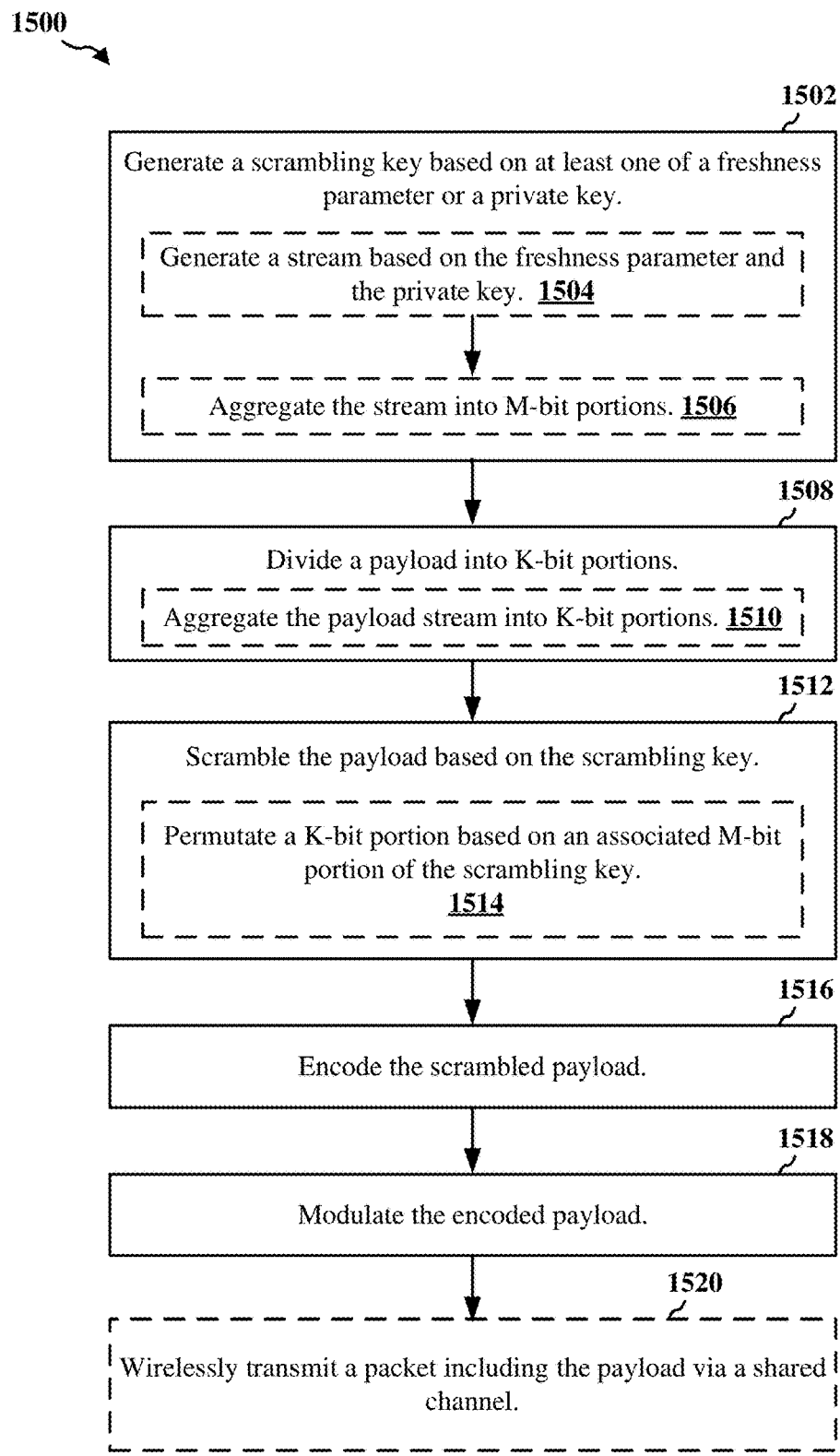
FIG. 15 is a flowchart of an example method of preparing data at the PHY layer for transmission.

FIG. 15 is a flowchart 1500 of an example method of a device (such as a base station) preparing data at the PHY layer for transmission (such as PDCCH or PDSCH information). The method illustrated in FIG. 15 may be an example implementation of the encoding process 1400 in FIG. 14. At 1502, the base station may generate a scrambling key based on at least one of a freshness parameter or a private key. In some implementations, the base station may generate a stream based on the private key, with the stream changing based on the freshness parameter (1504). The base station may then aggregate the stream into M-bit portions (1506).

The base station may also divide a payload (such as at least a portion of the MAC layer information and CRC) into K-bit portions (1508). In some implementations, the payload may be received at the encoding process as a stream, and the base station may aggregate the payload stream into K-bit portions (1510). The base station may then scramble the payload based on the scrambling key (1512). In some implementations, the base station may determine a permutation operation to be performed on each K-bit portion of the payload based on the associated M-bit portion of the scrambling key, and the base station may perform the determined permutation operation on the K-bit portion of the payload (1514). For example, the M-bit portion may be a permutation index of a set of permutation operations, and the base station may select the permutation operation corresponding to the permutation index.

The base station may then encode the scrambled payload (1516), and the base station may modulate the encoded payload based on, e.g., QPSK or QAM (1518). In some implementations, the base station may wirelessly transmit a packet including the payload (after the encoding process) via a shared channel (such as PDCCH or PDSCH) to a UE (1520).

FIGS. 8, 9, 11, 12, and 14 may be viewed as conceptual data flow diagrams illustrating the data flow between different means/components in an example apparatus (such as, e.g., a base station) transmitting information. The data flows in FIGS. 8, 9, 11, 12, and 14 may be performed in reverse order at a receiving apparatus (such as a UE). For example, an apparatus may include means/components to perform a decoding process, including demodulation, decoding, and descrambling.

An apparatus may include additional components that perform each of the blocks (or the inverse of each of the blocks) in the aforementioned flowcharts of FIGS. 6, 7, 10, 13, and 15. As such, each block in the aforementioned flowcharts of FIGS. 6, 7, 10, 13, and 15 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
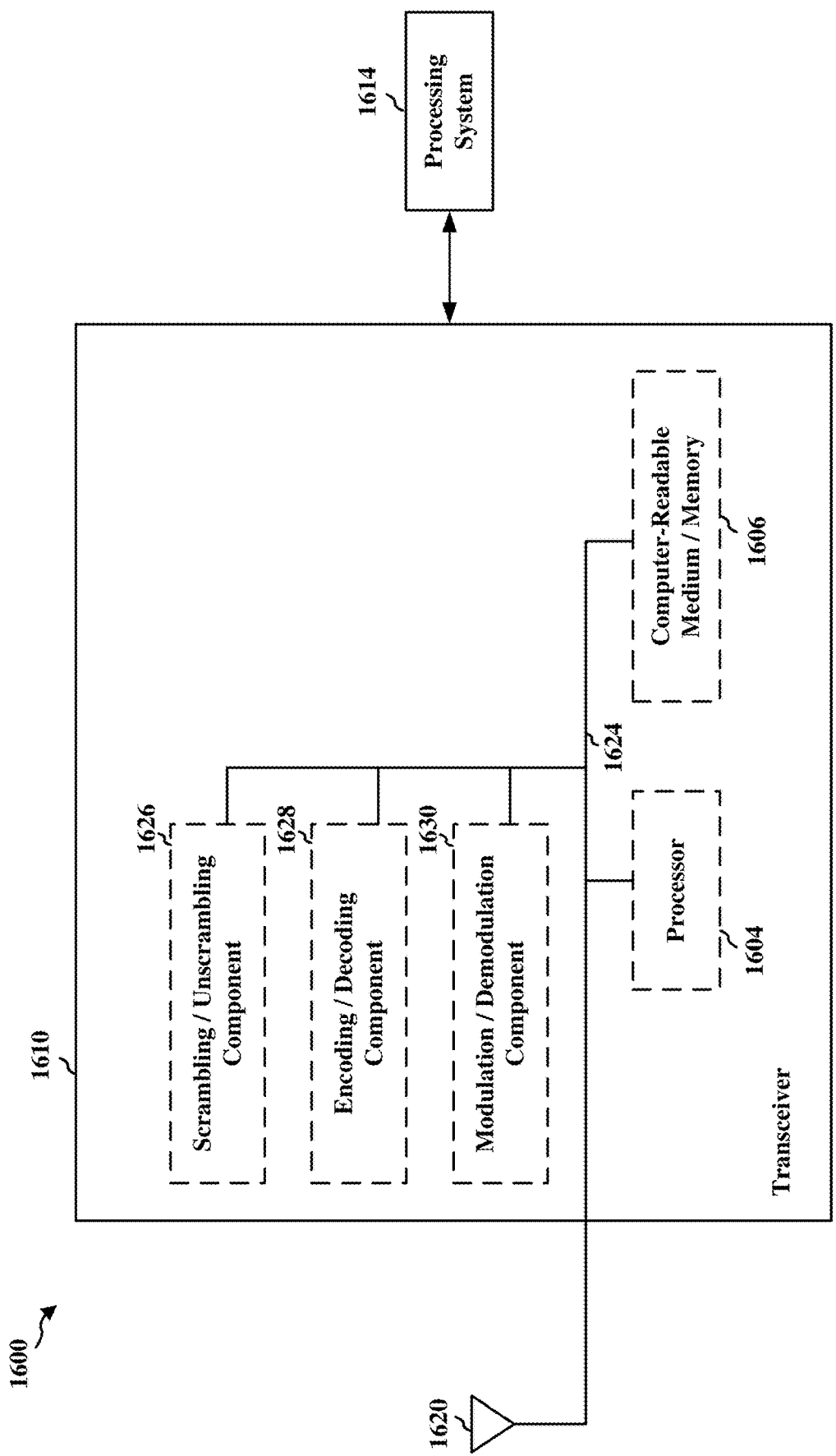
FIG. 16 is a diagram illustrating an example of a hardware implementation for an apparatus.

FIG. 16 is a diagram 1600 illustrating an example of a hardware implementation for an apparatus (such as a base station) employing one or more of the processes described herein. In some implementations, the processes may be implemented in a transceiver 1610. The transceiver 1610 may be implemented in any suitable manner. For example, the transceiver 1610 may be implemented with a bus architecture, represented generally by the bus 1624. The bus 1624 may include any number of interconnecting buses and bridges depending on the transceiver 1610 and the overall design constraints. In the example depiction, the bus 1624 links together various circuits, such as one or more processors and/or hardware components, represented by the processor 1604, the scrambling/unscrambling component 1626, the encoding/decoding component 1628, the modulation/demodulation component 1630, and a computer-readable medium/memory 1606. The bus 1624 may also link various other circuits that are not shown.

The transceiver 1610 may be coupled to a processing system 1614 configured to perform upper layer operations of a device. The transceiver 1610 is also coupled to one or more antennas 1620. The transceiver 1610 provides a means for communicating with various other apparatus over a transmission medium. The transceiver 1610 may be configured to transmit a signal via one or more antennas 1620. The signal may include information from the processing system 1614 that is encoded (such as via an example encoding process described herein) and prepared for transmission over a wireless link (such as a base station transmitting to a UE via a PDCCH or a PDSCH). In addition or alternative, to transmitting the signal, the transceiver 1610 may be configured to receive a signal from the one or more antennas 1620, extract information from the received signal (such as via a decoding process inverse to the encoding processes described herein), and provide the extracted information to the processing system 1614 (such as a UE receiving a signal from a base station via the PDCCH or the PDSCH).

The transceiver 1610 may include a processor 1604 (such as a TX processor 316 in FIG. 3) coupled to a computer-readable medium/memory 1606. The processor 1604 may be configured for general processing, including the execution of software stored on the computer-readable medium/memory 1606. The software, when executed by the processor 1604, may cause the transceiver 1610 to perform the various functions described supra for any particular apparatus. The transceiver 1610 may further (or alternatively) include at least one of the components 1626, 1628, and 1630. The components may be software components running in the processor 1604, resident/stored in the computer readable medium/memory 1606, one or more hardware components (which may be coupled to the processor 1604), or some combination thereof. The transceiver 1610 may be a component of the base station 310 and may include the memory 376 and/or at least one of the TX processor 316, the RX processor 370, or the controller/processor 375. In some implementations, the transceiver 1610 may be a component of the UE 350 and may include the memory 360 and/or at least one of the TX processor 368, the RX processor 356, or the controller/processor 359.

In one configuration, an apparatus for wireless communication may include means for generating a scrambling key based on at least one of a freshness parameter, a private key, or any combination thereof, and means for scrambling a payload based on the scrambling key at a physical layer. The apparatus may also include means for encoding the payload and means for modulating the payload. The aforementioned means may be one or more of the aforementioned components of the transceiver 1610 configured to perform the functions recited by the aforementioned means. As described supra, the transceiver 1610 may include at least one of the TX Processor 316 (or 368), the RX Processor 370 (or 356), or the controller/processor 375 (or 359). As such, in one configuration, the aforementioned means may be the TX Processor 316 (or 368) configured to perform the functions recited by the aforementioned means.

The apparatus for wireless communications may alternatively, or in addition, include means for demodulating, means for decoding, and means for unscrambling a received signal to provide recovered information from the signal to a processing system configured to perform upper layer operations. For example, in one configuration, the aforementioned means may be the RX Processor 370 (or 356) configured to perform the functions recited by the aforementioned means.

As described herein, scrambling a payload for transmission may be configured to provide security for wireless communications, such as LTE and 5G communications. Such security may prevent snooping, overshadowing, bit-flipping and other attacks that may be performed. In some implementations, a device (such as a base station) may generate a scrambling key based on a private key and a freshness parameter, and the device may scramble, at the PHY layer, at least a portion of a payload based on the scrambling key. Different implementations of the scrambling operation(s) may be performed by the device, and as such, prevent attacks from other devices without complicating error correction.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
generating, by a first device, a scrambling key based on at least one of a freshness parameter or a key, wherein the key is known by the first device and a second device;
aggregating a payload into a K-bit sequence using a K-bit aggregator, wherein K is a natural number that is greater than or equal to two;
aggregating the scrambling key into an M-bit permutation index using an M-bit aggregator, wherein M is a natural number greater than K;
scrambling at least a portion of the payload based on the scrambling key at a physical layer, wherein a packet includes the payload for wireless transmission from the first device to the second device via a channel, wherein the scrambling at least the portion of the payload comprises permutatinq the K-bit sequence with the M-bit permutation index;
encoding the permutated sequence; and
modulating the encoded sequence.

2. The method of claim 1, wherein the modulating the encoded sequence comprises:
modulating the encoded sequence based on Quadrature Phase-Shift Keying (QPSK) or Quadrature Amplitude Modulation (QAM).

3. The method of claim 1, further comprising:
generating a cyclic redundancy check (CRC) for media access control (MAC) layer information to be transmitted to the second device, wherein the payload includes the MAC layer information and the CRC.

4. The method of claim 3, wherein the scrambling at least the portion of the payload comprises scrambling only the CRC of the payload.

5. The method of claim 1, further comprising:
providing media access control (MAC) layer information to be included in the payload.

6. The method of claim 1, further comprising:
transmitting the packet to the second device via the channel.

7. The method of claim 1, wherein the first device is an access network node.

8. The method of claim 1, further comprising:
updating the freshness parameter based at least in part on a transmission the packet.

9. The method of claim 1, wherein the channel comprises a physical downlink control channel (PDCCH).

10. The method of claim 1, wherein the channel comprises a physical downlink shared channel (PDSCH).

11. The method of claim 1, wherein the key is a private key.

12. The method of claim 1, wherein the key is a shared key.

13. The method of claim 1, wherein the payload comprises control information.

14. The method of claim 1, wherein the payload comprises data.

15. An apparatus for wireless communication, comprising:
at least one processor; and
memory coupled to the at least one processor, the memory storing instructions executable by the at least one processor to cause the apparatus to:
generate a scrambling key based on at least one of a freshness parameter or a key, wherein the key is known by a device associated with the apparatus and a second device;
aggregate a payload into a K-bit sequence using a K-bit aggregator, wherein K is a natural number that is greater than or equal to two;
aggregate the scrambling key into an M-bit permutation index using an M-bit aggregator, wherein M is a natural number greater than K;
scramble at least a portion of the payload based on the scrambling key, wherein a packet includes the payload for wireless transmission from the device to the second device via channel, wherein scrambling at least the portion of the payload comprises permutatinq the K-bit sequence with the M-bit permutation index;
encode the permutated sequence; and
modulate the encoded sequence.

16. The apparatus of claim 15, wherein the memory storing instructions further comprises instructions executable by the at least one processor to cause the apparatus to:
modulate the encoded sequence based on Quadrature Phase-Shift Keying (QPSK) or Quadrature Amplitude Modulation (QAM).

17. The apparatus of claim 15, wherein the memory storing instructions further comprises instructions executable by the at least one processor to cause the apparatus to:
generate a cyclic redundancy check (CRC) for media access control (MAC) layer information to be transmitted to the second device, wherein the payload includes the MAC layer information and the CRC.

18. The apparatus of claim 17, wherein the memory storing instructions to scramble at least the portion of the payload comprises instructions executable by the at least one processor to cause the apparatus to scramble only the CRC of the payload.

19. The apparatus of claim 15, wherein the memory storing instructions further comprises instructions executable by the at least one processor to cause the apparatus to provide media access control (MAC) layer information to be included in the payload.

20. The apparatus of claim 19, wherein the memory storing instructions further comprises instructions executable by the at least one processor to cause the apparatus to transmit the packet to the second device via the channel.

21. The apparatus of claim 15, wherein the device associated with the apparatus is an access network node.

22. The apparatus of claim 15, wherein the memory storing instructions further comprises instructions executable by the at least one processor to cause the apparatus to:
update the freshness parameter based at least in part on a transmission the packet.

23. The apparatus of claim 15, wherein the channel comprises a physical downlink control channel (PDCCH).

24. The apparatus of claim 15, wherein the channel comprises a physical downlink shared channel (PDSCH).

25. The apparatus of claim 15, wherein the key is a private key.

26. The apparatus of claim 15, wherein the key is a shared key.

27. The apparatus of claim 15, wherein the payload comprises control information.

28. The apparatus of claim 15, wherein the payload comprises data.

29. A non-transitory computer-readable medium storing code for wireless communications, the code comprising instructions executable by at least one processor to:

generate a scrambling key based on at least one of a freshness parameter or a key, wherein the key is known by a device associated with the non-transitory computer-readable medium and a second device;

aggregate a payload into a K-bit sequence using a K-bit aggregator, wherein K is a natural number that is greater than or equal to two;

aggregate the scrambling key into an M-bit permutation index using an M-bit aggregator, wherein M is a natural number greater than K;

scramble at least a portion of the payload based on the scrambling key at a physical layer, wherein a packet includes the payload for wireless transmission from the device to the second device via a channel, wherein scrambling at least the portion of the payload comprises permutatinq the K-bit sequence with the M-bit permutation index;

encode the permutated sequence; and modulate the encoded sequence.

30. The non-transitory computer-readable medium of claim 29, wherein the code further comprises instructions executable by the at least one processor to:

modulate the encoded sequence based on Quadrature Phase-Shift Keying (QPSK) or Quadrature Amplitude Modulation (QAM).

31. The non-transitory computer-readable medium of claim 29, wherein the code further comprises instructions executable by the at least one processor to:

generate a cyclic redundancy check (CRC) for media access control (MAC) layer information to be transmitted to the second device, wherein the payload includes the MAC layer information and the CRC.

32. The non-transitory computer-readable medium of claim 31, wherein the code comprising instructions to scramble at least the portion of the payload comprises instructions executable by the at least one processor to scramble only the CRC of the payload.

33. The non-transitory computer-readable medium of claim 29, wherein the code further comprises instructions executable by the at least one processor to:

provide media access control (MAC) layer information to be included in the payload.

34. The non-transitory computer-readable medium of claim 29, wherein the code further comprises instructions executable by the at least one processor to:

transmit the packet to the second device via the channel.

35. The non-transitory computer-readable medium of claim 29, wherein the device associated with the non-transitory computer-readable medium is an access network node.

36. The non-transitory computer-readable medium of claim 29, wherein the code further comprises instructions executable by the at least one processor to:

update the freshness parameter based at least in part on a transmission the packet.

37. The non-transitory computer-readable medium of claim 29, wherein the channel comprises a physical downlink control channel (PDCCH).

38. The non-transitory computer-readable medium of claim 29, wherein the channel comprises a physical downlink shared channel (PDSCH).

39. The non-transitory computer-readable medium of claim 29, wherein the key is a private key.

40. The non-transitory computer-readable medium of claim 29, wherein the key is a shared key.

41. The non-transitory computer-readable medium of claim 29, wherein the payload comprises control information.

42. The non-transitory computer-readable medium of claim 29, wherein the payload comprises data.

43. An apparatus for wireless communication, comprising:

means for generating a scrambling key based on at least one of a freshness parameter or a key, wherein the key is known by the apparatus and a second device;

means for aggregating a payload into a K-bit sequence using a K-bit aggregator, wherein K is a natural number that is greater than or equal to two;

means for aggregating the scrambling key into an M-bit permutation index using an M-bit aggregator, wherein M is a natural number greater than K;

means for scrambling at least a portion of the payload based on the scrambling key at a physical layer of the apparatus, wherein a packet includes the payload for wireless transmission from the apparatus to the second device via a channel, wherein the scrambling at least the portion of the payload comprises permutatinq the K-bit sequence with the M-bit permutation index;

means for encoding the permutated sequence; and means for modulating the encoded sequence.

44. The apparatus of claim 43, wherein the means for modulating the encoded sequence comprises:

means for modulating the encoded sequence based on Quadrature Phase-Shift Keying (QPSK) or Quadrature Amplitude Modulation (QAM).

45. The apparatus of claim 43, further comprising:

means for generating a cyclic redundancy check (CRC) for media access control (MAC) layer information to be transmitted to the second device, wherein the payload includes the MAC layer information and the CRC.

46. The apparatus of claim 45, wherein the means for scrambling at least the portion of the payload comprises means for scrambling only the CRC of the payload.

47. The apparatus of claim 43, wherein the apparatus is an access network node.

48. The apparatus of claim 43, further comprising:

means for providing media access control (MAC) layer information to be included in the payload.

49. The apparatus of claim 43, further comprising:

means for transmitting the packet to the second device via the channel.

50. The apparatus of claim 43, further comprising:

means for updating the freshness parameter based at least in part on a transmission the packet.

51. The apparatus of claim 43, wherein the channel comprises a physical downlink control channel (PDCCH).

52. The apparatus of claim 43, wherein the channel comprises a physical downlink shared channel (PDSCH).

53. The apparatus of claim 43, wherein the key is a private key.

54. The apparatus of claim 43, wherein the key is a shared key.

55. The apparatus of claim 43, wherein the payload comprises control information.

56. The apparatus of claim 43, wherein the payload comprises data.

* * * * *